US011418790B2

(12) United States Patent
Said et al.

(10) Patent No.: US 11,418,790 B2
(45) Date of Patent: Aug. 16, 2022

(54) ARITHMETIC CODING WITH SELECTIVE ADAPTATION FOR VIDEO CODING

(71) Applicant: QUALCOMM Incorporated, San Diego, CA (US)

(72) Inventors: Amir Said, San Diego, CA (US); Cheng-Teh Hsieh, Del Mar, CA (US); Jie Dong, Sunnyvale, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/912,315

(22) Filed: Jun. 25, 2020

(65) Prior Publication Data

US 2020/0413061 A1 Dec. 31, 2020

Related U.S. Application Data

(60) Provisional application No. 62/868,736, filed on Jun. 28, 2019.

(51) Int. Cl.
*H04N 19/13* (2014.01)
*H04N 19/103* (2014.01)
(Continued)

(52) U.S. Cl.
CPC .......... *H04N 19/13* (2014.11); *H04N 19/103* (2014.11); *H04N 19/124* (2014.11); *H04N 19/176* (2014.11)

(58) Field of Classification Search
CPC .. H04N 19/126; H04N 19/176; H04N 19/463; H04N 19/13
See application file for complete search history.

(56) References Cited

U.S. PATENT DOCUMENTS 9,379,736 B2    6/2016  Sole et al.
2008/0240234 A1*  10/2008  Hung ................... H04N 19/436
                                                              375/240.02
(Continued)

FOREIGN PATENT DOCUMENTS

WO       2012167103        12/2012

OTHER PUBLICATIONS

Bross B., et al., "Versatile Video Coding (Draft 5)", 14. JVET Meeting, Mar. 19, 2019-Mar. 27, 2019, Geneva, (The Joint Video Exploration Team of ISO/IEC JTC1/SC29/WG11 and ITU-T SG.16), No. JVET-N1001-v10, Jun. 11, 2019 (Jun. 11, 2019), XP030205561, pp. 1-408, Retrieved from the Internet: URL:http://phenix.int-evry.fr/jvet/doc_end_user/documents/14_Geneva/wg11/JVET-N1001-v10.zip JVET-N1001-v10.docx [retrieved on Jun. 11, 2019] abstract section 2, sections 7.3.2.4 and 7.4.3.4, section 7.3.7.5, section 7.3.7.10.

(Continued)

*Primary Examiner* — Zhubing Ren
(74) *Attorney, Agent, or Firm* — Espartaco Diaz Hidalgo

(57) ABSTRACT

Techniques are described of hybrid coders that are configured to selectively use adaptive or non-adaptive coding techniques. A video coder (e.g., video encoder or video decoder) may code (e.g., encode or decode) first video data (e.g., a syntax element or value), for coding a first block, based on an adaptive context model (e.g., one or more adaptive context models) and code second video data, for coding a second block, based on a non-adaptive context model (e.g., one or more non-adaptive context models).

29 Claims, 9 Drawing Sheets

(51) Int. Cl.
*H04N 19/124* (2014.01)
*H04N 19/176* (2014.01)

(56) References Cited

U.S. PATENT DOCUMENTS

| | | | | |
|---|---|---|---|---|
| 2012/0328026 A1* | 12/2012 | Sole Rojals | ......... | H04N 19/463 375/240.18 |
| 2013/0003834 A1* | 1/2013 | Rojals | ............ | H04N 19/13 375/240.12 |
| 2013/0182757 A1* | 7/2013 | Karczewicz | ........... | H04N 19/13 375/240.02 |
| 2013/0336388 A1* | 12/2013 | Terada | ................ | H04N 19/90 375/240.03 |
| 2016/0227217 A1* | 8/2016 | Karczewicz | ......... | H04N 19/463 |
| 2017/0155909 A1* | 6/2017 | Sze | ..................... | H04N 19/91 |

OTHER PUBLICATIONS

Bross et al., "Versatile Video Coding (Draft 9)", Joint Video Experts Team (JVET) of ITU-T SG 16 WP 3 and ISO/IEC JTC 1/SC 29/WG 11, 18th Meeting: by teleconference, Apr. 15-24, 2020, Document: JVET-R2001-v8, 528 Pages.

Chen J., et al., "Algorithm Description of Joint Exploration Test Model 1," 1, JVET Meeting, Oct. 19-21, 2015, Geneva;(The Joint Video Exploration Team of ISO/IEC JTC1/SC29/WG11 and ITU-T SG.16); URL: http://phenix.int-evry.fr/jvet/ ,, No. JVET-A1001 Feb. 24, 2016 (Feb. 24, 2016), XP030150000, 27 pages.

International Search Report and Written Opinion—PCT/US2020/039808—ISA/EPO—dated Aug. 28, 2020.

ITU-T H.265, "Series H: Audiovisual and Multimedia Systems, Infrastructure of Audiovisual Services—Coding of Moving Video, High efficiency Video Coding," The International Telecommunication Union, Dec. 2016, 664 Pages.

Joshi R., et al., "CE1: Delayed State Update for CABAC", 7. JCT-VC Meeting, 98. MPEG Meeting, Nov. 21, 2011-Nov. 30, 2011, Geneva, (Joint Collaboration Team on IDEO Coding of ISO/IEC JTCI/SC29/WG11 and ITU-T 56.16), URL: http://wftp3.itu.int/av-arch/jctvc-site/, No. JCTVC-G576, Nov. 9, 2011 (Nov. 9, 2011), XP030110560, 5 Pages.

Marpe D., et al., "Context-Based Adaptive Binary Arithmetic Coding in the H.264/AVC Video Compression Standard", IEEE Transactions on Circuits And Systems For Video Technology, vol. 13, No. 7, Jul. 1, 2003, pp. 620-636, XP055120073, ISSN: 1051-8215, DOI: 10.1109/TCSVT.2003.815173, Url: http://dx.doi.org/10.1109/TCSVT.2003.815173.

Said, A. et al., "CE5: Per-Context CABAC Initialization with Double Windows (Test 5.1.3)", JVET-M0412, Joint Video Experts Team (JVET) of ITU-T SG 16 WP 3 and ISO/IEC JTC 1/SC 29/WG 11, 13th Meeting: Marrakech, MA, Jan. 9-18, 2019, pp. 1-4.

Said, A. et al., "Context Memory Reduction Via Selective Adaptation", JVET-O0741-v4, Joint Video Experts Team (JVET) of ITU-T SG 16 WP 3 and ISO/IEC JTC 1/SC 29/WG 11, 15th Meeting: Gothenburg, SE, Jul. 3-12, 2019, pp. 1-14.

Said A., et al., "EE2: Arithmetic Coding with Context-Dependent Double-Window Adaptation Response", Joint Video Exploration Team (JVET) of ITU-T SG 16 WP 3 and ISO/IEC JTC 1/SC 29/WG 11, 8th JVET Meeting: Macao, CN, Oct. 18-24, 2017, JVET-H0061, pp. 1-9.

Wien M, "High Efficiency Video Coding, Coding Tools and specification", Chapter 5, 2015, pp. 133-160.

Yuanzhi Z, et al., "A Highly Parallel Hardware Architecture of Table-Based CABAC Bit Rate Estimator in an HEVC Intra Encoder", IEEE Transactions on Circuits and Systems for Video Technology, Institute of Electrical and Electronics Engineers, US, vol. 29, No. 5, May 1, 2019 (May 1, 2019), pp. 1544-1558, XP011722698, 15 pages, ISSN: 1051-8215, DOI: 10.1109/TCSVT.2018.2830126 [retrieved on May 2, 2019] p. 1546, right-hand column; figures 2c,2d.

Bross B., et al., "Versatile Video Coding (Draft 5)", Joint Video Experts Team (JVET) of ITU-T SG 16 WP 3 and ISO/IEC 14 UTC 1/5C 29/WG 11, 14th Meeting: Geneva, CH, Mar. 19-27, 2019, JVET-N1001-v8, 399 Pages, XP030212626, Retrieved from the Internet: URL: http://phenix.int-evry.fr/mpeg/doc_end_user/documents/126_Geneva/wg11/m48053JVET-N1001-v8-JVET-N1001-v8.zip. JVET-N1001-v8.docx. [retrieved on Jun. 11, 2019] Section 8.4.5.2.11 Specification of Intra DC intra prediction mode Section 8.7.5 Picture reconstruction.

* cited by examiner

ARITHMETIC CODING WITH SELECTIVE ADAPTATION FOR VIDEO CODING

This application claims the benefit of U.S. Provisional Patent Application 62/868,736, filed Jun. 28, 2019, the entire content of which is incorporated by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes examples of hybrid coders that are configured to selectively use adaptive or non-adaptive coding techniques. For example, a video coder (e.g., video encoder or video decoder) may code (e.g., encode or decode) first video data (e.g., a syntax element or value), for coding a first block, based on an adaptive context model (e.g., one or more adaptive context models) and code second video data, for coding a second block, based on a non-adaptive context model (e.g., one or more non-adaptive context models). As one example, the video coder may code a first syntax element using context-based arithmetic coding with adaptive context models and code a second syntax element using context-based arithmetic coding with non-adaptive context models. The first and second syntax elements may be part of a bitstream.

Entropy coding (e.g., context-based arithmetic coding) with adaptive context models (also called adaptive arithmetic coding) may refer to examples where context models (e.g., probability tables) for the contexts are updated while the bitstream is being processed. Entropy coding (e.g., context-based arithmetic coding) with non-adaptive context models (also called non-adaptive arithmetic coding) may refer to examples where context models (e.g., probability tables) for the contexts are not updated while the bitstream is being processed. A context may refer to a type of data that is being encoded or decoded (e.g., motion vector difference values, transform coefficients, etc.). In both adaptive arithmetic coding and non-adaptive arithmetic coding, the probability values are generally non-50% values and are selected based on contexts (e.g., such as the type of information being coded).

Selectively using adaptive or non-adaptive coding techniques may allow for a relatively fast, but size constrained, memory to store a subset of context models that are adapted, while another memory stores context models that are not adapted. In this way, a video coder may be able leverage the coding gains of entropy coding without needing to store all context models in the fast, but size constrained, memory.

In one example, the disclosure describes a method of coding video data, the method comprising coding first video data, for coding a first block, based on an adaptive context model and coding second video data, for coding a second block, based on a non-adaptive context model.

In one example, the disclosure describes a device for coding video data, the device comprising a plurality of memories configured to store context models and an integrated circuit configured to code first video data, for coding a first block, based on an adaptive context model and code second video data, for coding a second block, based on a non-adaptive context model.

In one example, the disclosure describes a computer-readable storage medium storing instructions thereon that when executed cause one or more processors to code first video data, for coding a first block, based on an adaptive context model and code second video data, for coding a second block, based on a non-adaptive context model.

In one example, the disclosure describes a device for coding video data, the device comprising means for coding first video data, for coding a first block, based on an adaptive context model and means for coding second video data, for coding a second block, based on a non-adaptive context model.

The details of one or more examples are set forth in the accompanying drawings and the description below. Other features, objects, and advantages will be apparent from the description, drawings, and claims.

DETAILED DESCRIPTION

Figure 1:
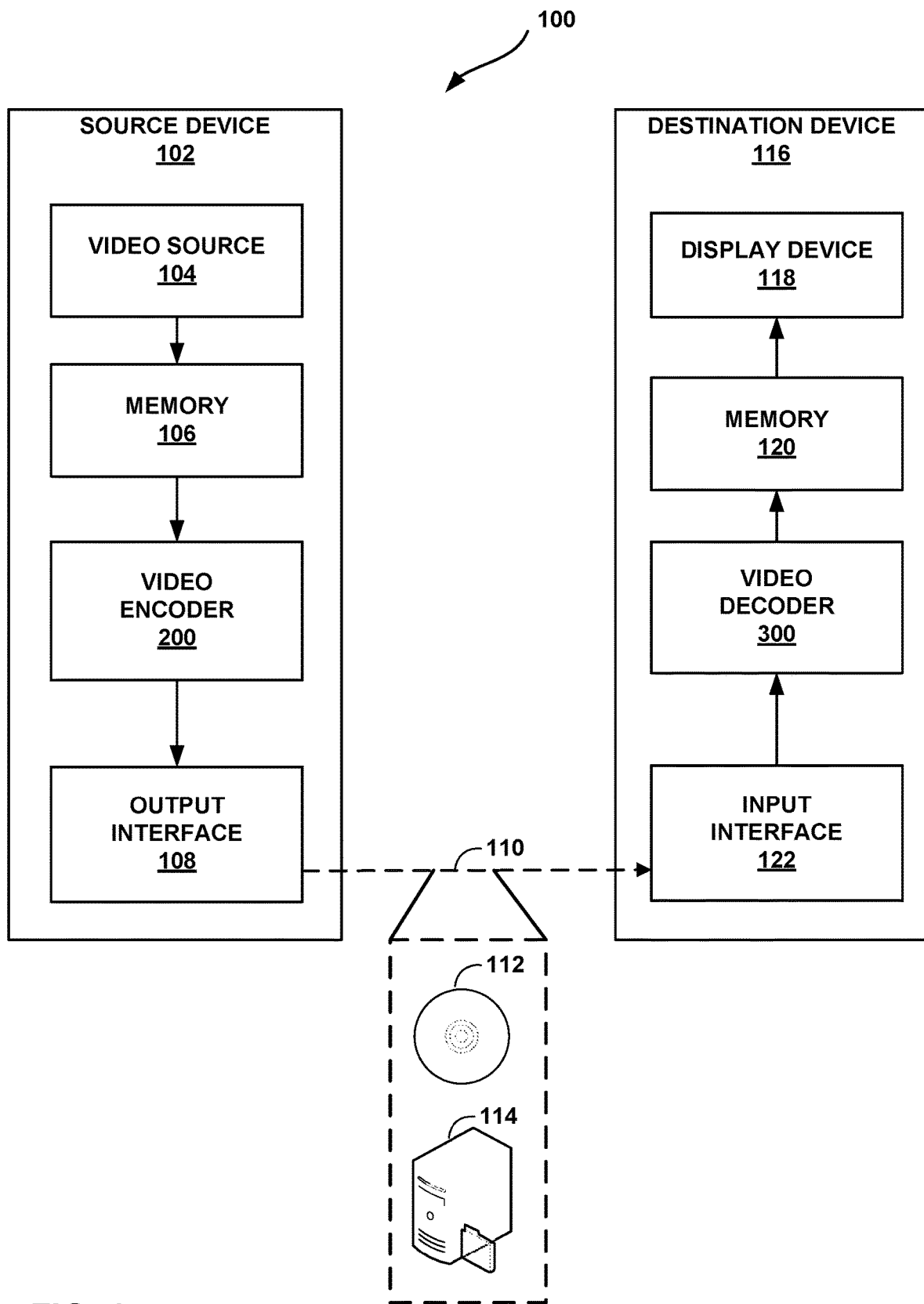
FIG. 1 is a block diagram illustrating an example video encoding and decoding system that may perform the techniques of this disclosure.

In video coding, image data (e.g., syntax elements or values) define information about a current block that is being coded. For example, the syntax elements may represent motion vector information for a current block, or include flags used to define coefficient values in a transform block of a residual block for the current block, as a few examples. In some examples, a video encoder binarizes the image data (e.g., values of the syntax elements) into a string of bins, where each bin has a value of 1 or 0, and then entropy encodes the binarized values (e.g., string of bins) to generate bits of a bitstream. A video decoder entropy decodes the bits of the bitstream to generate the binarized values (e.g., the string of bins), and de-binarizes the binarized values to determine the value of the syntax element. Binarization of syntax elements may not be necessary in all examples.

One example way to entropy encode or entropy decode syntax elements is with context-based coding with adaptive context models (also called adaptive arithmetic coding). In context-based coding, memory stores context models (e.g., probability tables) used to indicate a probability of a bin. For example, in context-based coding, a context model may indicate the probability value of a bin value being a 0 or 1. For ease of description, the examples are described with respect to binary arithmetic coding, but the example techniques are not so limited. An arithmetic coding unit utilizes the probability value and the actual bin value to perform arithmetic coding on a bin-by-bin basis.

A context is used to identify a context model stored in memory. In some examples, the context, as well as values of neighboring blocks, may together identify the context model stored in memory. A context may refer to a type of information (e.g., type of image data) that is being coded. For instance, the context may form as an index or address that identifies the context model to use on a bin-by-bin basis.

In coding with adaptive context models, an adaptation unit uses the actual value of a bin and the context model selected from memory to adapt (e.g., update) the context model. Accordingly, in coding with adaptive context models, the context model is read from memory, updated, and written back to memory such that the next time the context model is used, the updated context model is used to determine the probability value of a bin.

With development of faster hardware resulting in improvement in throughput through the coding unit, more and more syntax elements are being coded using coding with adaptive context models. With the increase in the number of syntax elements that are being coded using coding with adaptive context models, the number of context models that are stored also increases.

However, there may be size constraints (i.e., limit on how much data can be stored) on the memory that stores the adaptive context models. For example, for the adaptive context models, the memory that stores the context models needs to be read from and written to. To ensure a high throughput, the reading and writing needs to be done relatively fast (i.e., the memory is a fast memory). The amount of power needed for the memory may be based on how fast the memory is written to and read from and the size of the memory (i.e., how much data the memory can store). In some cases, the amount of power needed to power a memory that stores all of the desired context models that can be updated may be greater than the available power, which limits the size of the memory. However, there may be compression benefits using context-based coding, as compared to non-context-based coding, such as bypass coding.

This disclosure describes examples of selectively using context-based coding with adaptive context models or using context-based coding with non-adaptive context models. In one or more examples, rather than storing all context models in the memory that needs to be written to and read from so that the context models can be adapted, a subset of the context models are stored in the memory. The other context models may be stored in a memory that can be read from but not written to. Accordingly, these other context models may not be adaptive.

Although the compression may not be as high when using non-adaptive context models as compared to adaptive context models, the image data (e.g., syntax elements or values) may be compressed sufficiently with non-adaptive context models. Accordingly, at least some of the benefits of context-based coding may be available even with non-adaptive context models. For example, the amount of compression with non-adaptive context models may still be higher than the amount of compression from coding techniques that do not rely on context models, such as bypass coding. However, because the memory that stores the non-adaptive context models is a read only memory (e.g., read from but not written to), the memory that stores the non-adaptive context models can be made sufficiently large without the power penalty associated with memory that stores the adaptive context models.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, tablet computers, set-top boxes, telephone handsets such smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for selectively using adaptive or non-adaptive coding techniques. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than including an integrated display device.

System 100 as shown in FIG. 1 is merely one example. In general, any digital video encoding and/or decoding device may perform techniques for selectively using adaptive or non-adaptive coding techniques. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, devices 102, 116 may operate in a substantially symmetrical manner such that each of devices 102, 116 include video encoding and decoding components. Hence, system 100 may support one-way or two-way video transmission between video devices 102, 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). A draft of the VVC standard is described in Bross, et al. "Versatile Video Coding (Draft 5)," Joint Video Experts Team (JVET) of ITU-T SG 16 WP 3 and ISO/IEC JTC 1/SC 29/WG 11, 14$^{th}$ Meeting: Geneva, CH, 19-27 Mar. 2019, JVET-N1001-v9 (hereinafter "VVC Draft 5"). A more recent draft of the VVC standard is described in Bross, et al. "Versatile Video Coding (Draft 9)," Joint Video Experts Team (JVET) of ITU-T SG 16 WP 3 and ISO/IEC JTC 1/SC 29/WG 11, 18$^{th}$ Meeting: by teleconference, 15-24 Apr. 2020, JVET-R2001-v8 (hereinafter "VVC Draft 9"). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) partitions. A triple tree partition is a partition where a block is split into three sub-blocks. In some examples, a triple tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile.

The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

In some examples, VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. In some examples, VVC provides sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the coefficients, providing further compression. By performing the quantization process, video encoder 200 may reduce the bit depth associated with some or all of the coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform entropy coding (e.g., CABAC), video encoder 200 may assign a context within a context model to a symbol to be transmitted. The context may relate to, for example, whether neighboring values of the symbol (e.g., bin) are zero-valued or not. The probability determination may be based on a context assigned to the symbol. CABAC is one example of context-based arithmetic coding, and the example techniques are not limited to CABAC.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data. The term syntax data or syntax element may be used to indicate any information that is encoded by video encoder 200 for transmission into a bitstream.

As described above, in context-based coding (e.g., entropy coding, such as arithmetic coding) with adaptive context models, a context model is updated (e.g., adapted) based on a current value of a bin and the current context model. For example, as described in more detail below, for context-based coding with adaptive context models, an adaptation unit reads a current context model, where the current context model is indicative of a probability value of the bin being zero-valued or not, from memory. Based on the current context model and the actual value of the bin, the adaptation unit adapts (e.g., updates) the current context model.

To ensure sufficiently high throughput, the reading, updating, and writing of a context model should be relatively fast. Accordingly, the memory that stores the context models should be configured or designed for fast access. However, ensuring fast access may constrain the size of the memory because the amount of power needed to ensure fast access and large storage size for the memory may not be available.

In one or more examples, video encoder 200 may also include a memory, such as a read-only memory (ROM), that stores context models. The context models stored in the ROM may not be adaptive since the context models are not updated. Based on the context that is needed, video encoder 200 may access the memory that stores contexts that are updated or the memory that stores contexts that are not updated and performs coding on the bins based on the accessed context models. Because updated context models are not written to the ROM, the ROM can be made as large as desired without the power penalty of the memory that stores the context models that are updated.

For example, context-based arithmetic coding with adaptive context models may provide the highest level of compression. However, if all syntax elements that can be context-based coded are coded with adaptive context models, the power needed to support the memory that stores the context models that are adapted may be greater than the budgeted or desired power. To address this issue, some techniques utilize bypass coding (i.e., non-context-based coding) even for syntax elements that can be context-based coded.

With the techniques described in this disclosure, video encoder 200 may context-based code syntax elements utilizing non-adaptive context models. For example, for some contexts (e.g., types of image data, like syntax elements), utilizing non-adaptive context models may provide a sufficient level of compression, which is still greater compression than if bypass coding is utilized.

The selection of which syntax elements are context-based coded with adaptive context models and which image data (e.g., syntax elements or values) are context-based coded with non-adaptive context models may be a design choice. For example, if video encoder 200 is configured to perform in accordance with a video coding standard, then the video coding standard may define which syntax elements are context-based coded with adaptive context models and which syntax elements are context-based coded with non-adaptive context models.

As another examples, video encoder 200 and video decoder 300 may be part of a device, like a mobile communication device, a television, a camcorder, etc. These devices may include video decoders that conform to a particular standard. However, after these video decoders decode video data, these devices may include a video encoder, like video encoder 200, that re-encodes the decoded video data for storage for later retrieval, and a video decoder, like video decoder 300, the re-decodes the re-encoded video data for display. In one or more examples, video encoder 200 and video decoder 300 may be examples of video encoders and video decoders that re-encode and re-decode the video data. In such examples, the designer of the television or designer of video encoder 200 and video decoder 300 may determine which image data is context-based coded with non-adaptive context models and which image data is context-based coded with adaptive context models.

That is, even if a standard does not define which image data is context-based coded with adaptive context models and which image data is context-based coded with non-adaptive context models, it may be possible for a device to include video encoder 200 and video decoder 300 in which image data is selectively context-based coded with adaptive context models or context-based coded with non-adaptive context models. In examples where the standard defines image data that is context-based coded with adaptive context models and image data that is context-based coded with non-adaptive context models, video encoder 200 and video decoder 300 may be configured to encode or decode image data, for coding a block, based on an adaptive context model (e.g., one or more adaptive context models) or a non-adaptive context model (e.g., one or more non-adaptive context models).

For example, video encoder 200 may encode first video data, for encoding a first block, based on an adaptive context model, and encode second video data, for coding a second block, based on a non-adaptive context model. Video decoder 300 may decode first video data, for decoding a first block, based on an adaptive context model, and decode second video data, for decoding a second block, based on a non-adaptive context model. The first and second video data may be syntax elements or values, such as coefficient values. Also, the first block and the second block may be in the same picture or in different pictures. For instance, the first block and the second block are terms used to identify two different blocks and do not necessarily imply that the first block is coded before the second block, or vice-versa. In this manner, video encoder 200 and video decoder 300 may select and switch between coding based on an adaptive context model (e.g., one or more adaptive context models) and coding based on a non-adaptive context model (e.g., one or more non-adaptive context models).

Accordingly, video encoder 200 may determine whether to encode image data utilizing context-based coding with adaptive context models or context-based coding with non-adaptive context models based on the type of image data (e.g., type of syntax element or value). There may be other causes for video encoder 200 to determine to utilize context-based coding with adaptive context models or context-based coding with non-adaptive context models. As one example, if a number of consecutive syntax elements is coded with context-based coding with adaptive context models, then, to increase the throughput, video encoder 200 may code the next syntax element, even if that syntax element is normally coded with an adaptive context model, utilizing context-based coding with non-adaptive context models.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

As described above, this disclosure describes example techniques for selectively using context-based adaptive and context-based non-adaptive coding techniques (e.g., adaptive or non-adaptive entropy coding, such as CABAC). Adaptive coding (e.g., context-based coding with adaptive context models) may refer to examples where the context models (e.g., probability tables) are updated while the bitstream is being processed. Non-adaptive coding (e.g., context-based coding with non-adaptive context models) may refer to examples where the coding models (e.g., probability tables) are not updated during processing. In both adaptive coding and non-adaptive coding, the probability values (e.g., from the context models) are generally non-50% values and are selected based on contexts (e.g., such as information of previously encoded or decoded blocks of video data).

Non-adaptive coding should not be confused with bypass mode in context-adaptive binary arithmetic coding where the probability values are assumed to be 50% or where contexts are not used at all for coding. In non-adaptive or adaptive context models, the probability values tend not to be 50% and are based on contexts, unlike bypass mode. Examples of adaptive and non-adaptive encoders and decoders are described in more detail below.

In accordance with the techniques of this disclosure, video encoder 200 and video decoder 300 may be configured to selectively determine whether to encode or decode, respectively, image data for coding a block (e.g., a syntax element or value) utilizing context-based coding with adaptive context models or utilizing context-based coding with non-adaptive context models. Based on the determination, video encoder 200 and video decoder 300 may encode or decode the image data utilizing context-based coding with adaptive context models or utilizing context-based coding with non-adaptive context models. In this way, a bitstream may include syntax elements that have been coded utilizing context-based coding with adaptive context models or utilizing context-based coding with non-adaptive context models.

For example, video decoder 300 may be configured to decode first video data, for decoding a first block, based on an adaptive context models and decode second video data, for decoding a second block, based on a non-adaptive context models. As an example, video decoder 300 may decode a first syntax element received in a bitstream using context-based arithmetic decoding with adaptive context models (e.g., using adaptive binary arithmetic decoding) and decode a second syntax element received in the bitstream using context-based arithmetic decoding with non-adaptive context models (e.g., non-adaptive binary arithmetic encoding).

Video encoder 200 may be configured to encode first video data, for encoding a first block, based on an adaptive context model and encode second video data, for encoding a second block, based on a non-adaptive context model. As one example, video encoder 200 may be configured to encode a first syntax element received in a bitstream using context-based arithmetic encoding with adaptive context models (e.g., adaptive binary arithmetic encoding) and encode a second syntax element received in the bitstream using context-based arithmetic encoding with non-adaptive context models (e.g., non-adaptive binary arithmetic encoding).

In the above examples, the first block and the second block may be in the same slice or picture or different slices or pictures. For instance, the first block and the second block are terms used to identify two different blocks and do not necessarily imply that the first block is coded before the second block, or vice-versa. Also, the first syntax element may be for coding the first block (e.g., motion vector difference or significance flag for the first block), and the second syntax element may be for coding the second block (e.g., motion vector difference or significance flag for the second block).

For example, video encoder 200 and video decoder 300 may each determine whether the first video data and/or the second video data is to be coded (e.g., encoded or decoded) using adaptive coding (e.g., encoding or decoding) or non-adaptive coding. Techniques to determine whether to used adaptive or non-adaptive binary coding is described in more detail below. In the above example, video encoder 200 and video decoder 300 determined that the first video data is to be coded using context-based adaptive coding and the second video data is to be coded using context-based non-adaptive coding.

As one example, to code (e.g., encode or decode) the first video data, the video coder may be configured to code the first video data using entropy coding with adaptive context models, and to code the second video data, the video coder may be configured to code the second video data using entropy coding with non-adaptive context models. For example, to code the first video data using entropy coding, the video coder may be configured to code the first video data using context-based coding with adaptive context models, and to code the second video data using entropy coding, the video coder may be configured to code the second video data using context-based coding with non-adaptive context models.

Figure 2A:
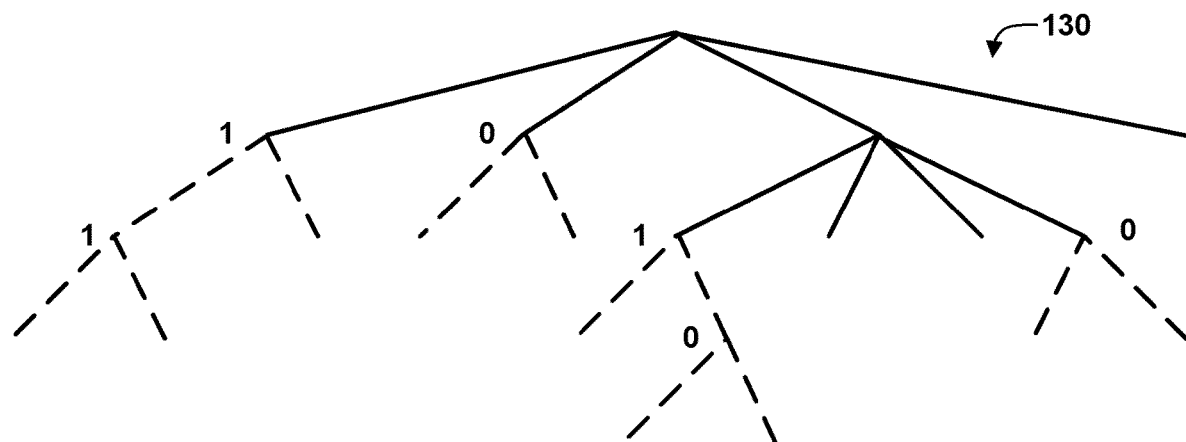
FIGS. 2A and 2B are conceptual diagrams illustrating an example quadtree binary tree (QTBT) structure, and a corresponding coding tree unit (CTU).
Figure 2B:
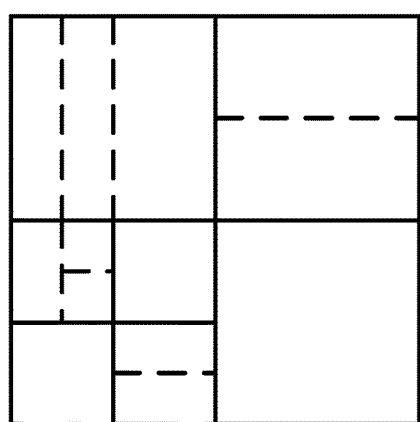

FIGS. 2A and 2B are conceptual diagram illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, since quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), then the nodes can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the leaf quadtree node is 128×128, it will not be further split by the binary tree, since the size exceeds the MaxBTSize (i.e., 64×64, in this example). Otherwise, the leaf quadtree node will be further partitioned by the binary tree. Therefore, the quadtree leaf node is also the root node for the binary tree and has the binary tree depth as 0. When the binary tree depth reaches MaxBTDepth (4, in this example), no further splitting is permitted. When the binary tree node has width equal to MinBTSize (4, in this example), it implies no further horizontal splitting is permitted. Similarly, a binary tree node having a height equal to MinBTSize implies no further vertical splitting is permitted for that binary tree node. As noted above, leaf nodes of the binary tree are referred to as CUs, and are further processed according to prediction and transform without further partitioning.

Figure 3:
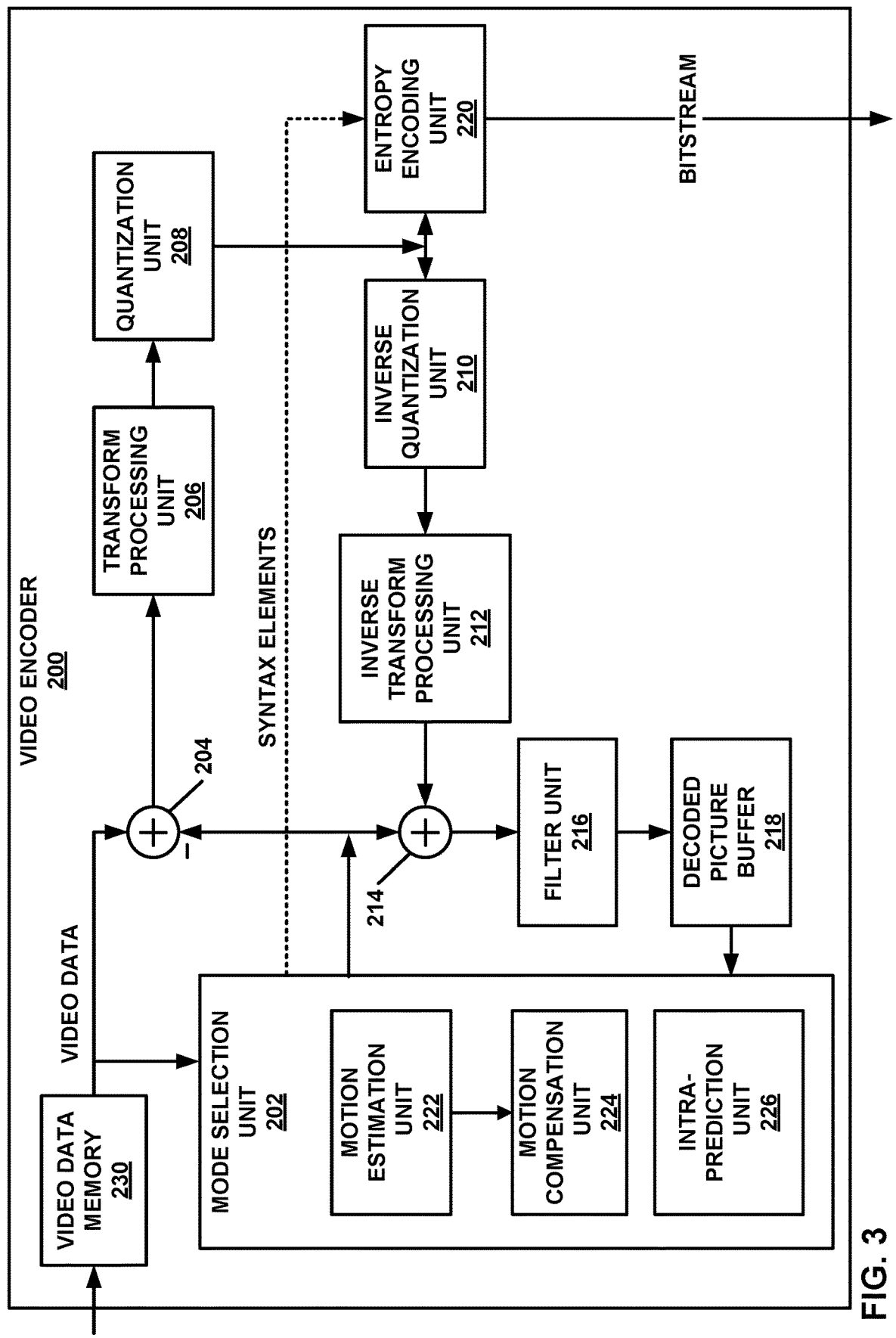
FIG. 3 is a block diagram illustrating an example video encoder that may perform the techniques of this disclosure.

FIG. 3 is a block diagram illustrating an example video encoder 200 that may perform the techniques of this disclosure. FIG. 3 is provided for purposes of explanation and should not be considered limiting of the techniques as broadly exemplified and described in this disclosure. For purposes of explanation, this disclosure describes video encoder 200 in the context of video coding standards such as the H.265 (HEVC) video coding standard and the H.266 (VVC) video coding standard in development. However, the techniques of this disclosure are not limited to these video coding standards, and are applicable generally to video encoding and decoding.

In the example of FIG. 3, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry (e.g., integrated circuit). Moreover, video encoder 200 may include additional or alternative processors or processing circuitry (e.g., integrated circuit) to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 3 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the object code of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Figure 7:
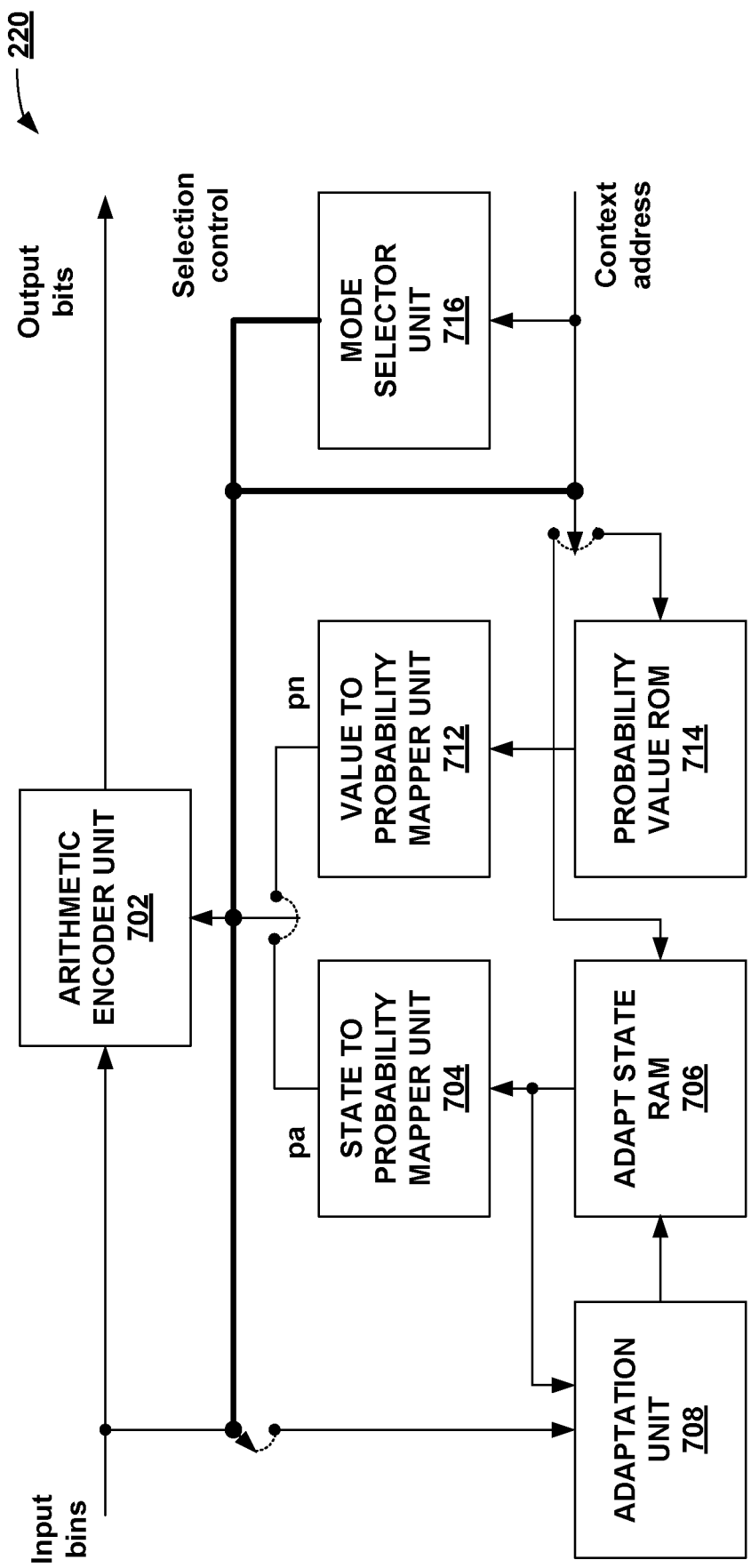
FIG. 7 is a conceptual diagram illustrating an example of a combination of adaptive and non-adaptive arithmetic encoders.

In accordance with techniques described in this disclosure, entropy encoding unit 220 may be configured to perform context-based encoding (e.g., context-based arithmetic encoding) utilizing adaptive context models or non-adaptive context models. FIG. 7 illustrates an example of entropy encoding unit 220 in further detail, and illustrates example ways in which entropy encoding unit 220 may select between context-based encoding utilizing adaptive context models or non-adaptive context models. If context-based coding is not available (e.g., because of random probability of a bin being zero or one), then entropy encoding unit 220 may be configured to perform bypass encoding.

Video encoder 200 represents an example of a device configured to encode video data including a memory configured to store video data, and one or more processing units implemented as an integrated circuit (e.g., such as entropy encoding unit 220) and configured to encode first video data, for encoding a first block, based on an adaptive context model and encode second video data, for encoding a second block, based on a non-adaptive context model. As one example, to encode the first video data, the integrated circuit may encode the first video data using entropy coding with adaptive context models, and to encode the second video data, encode the second video data using entropy coding with non-adaptive context models. For instance, to encode the first video data using entropy coding, the integrated circuit may context-based arithmetic encode (e.g., CABAC) the first video data with adaptive context models, and to encode the second video data using entropy coding, the integrated circuit may context-based arithmetic encode (e.g., CABAC) the second video data with non-adaptive context models.

For example, video encoder 200 (e.g., via entropy encoding unit 220) may determine whether the first video data is to be encoded using adaptive encoding or non-adaptive encoding and determine that the first video data is to be encoded using adaptive encoding. Video encoder 200 (e.g., via entropy encoding unit 220) may determine whether the second video data is to be encoded using adaptive encoding or non-adaptive encoding and determine that the second video data is to be encoded using non-adaptive encoding.

There may be various ways in which video encoder 200 may determine whether to encode using adaptive or non-adaptive encoding. As a few example, described in more detail below, video encoder 200 may determine whether the first video data is to be encoded using adaptive encoding or non-adaptive encoding based on at least one of: a context used to encode the first video data, frequency of use of the context model used to encode the first video data, stability of the context model used to encode the first video data, and comparison of the context used to encode the first video data to a threshold value. The same techniques may be utilized for determining whether the second video data is to be encoded using adaptive encoding or non-adaptive encoding.

For encoding the first video data using context-based coding with adaptive context models, video encoder 200 (e.g., via entropy encoding unit 220) may be configured to adapt (e.g., update) one or more context models based on previous input bins to generate one or more adapted context models and store the one or more adapted context models in a first memory (e.g., a fast memory such as a random-access memory including a register or an L1 cache). One example of adapting is changing information indicative of a probability being a 0 or a 1 based on the previous input bin. Then, when encoding the video data, video encoder 200 may read the one or more adapted context models from the first memory and context-based encode the first video data with the one or more adapted context models read from the first memory. In some examples, the adapting of the context model and the storing of the one or more adapted context models may have occurred previous to the coding of the first video data such that the adapted one or more context models are already stored in the memory.

For encoding the second video data using context-based coding with non-adaptive context models, video encoder 200 (e.g., via entropy encoding unit 220) may be configured to read one or more context models from a second memory (e.g., a ROM) and context-based encode the second video data with the one or more context models read from the second memory. For the non-adaptive context models, there may be no need to write or update, which allows the second memory to be read-only memory (ROM). Accordingly, the ROM may provide fast read access, but no write access, which allows the ROM to be sufficiently large to support many context models without a power penalty (e.g., without consuming a lot of power).

Figure 4:
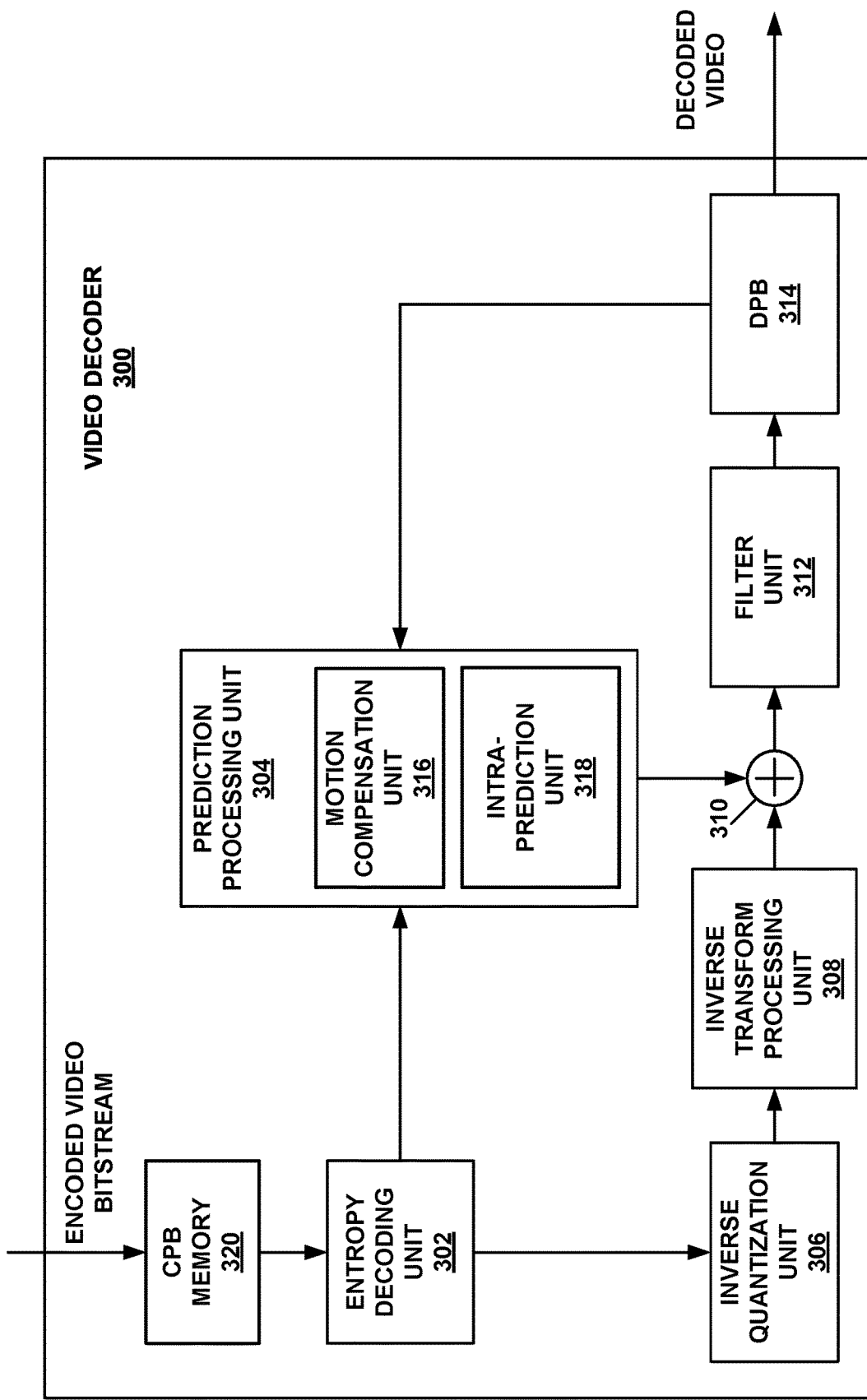
FIG. 4 is a block diagram illustrating an example video decoder that may perform the techniques of this disclosure.

FIG. 4 is a block diagram illustrating an example video decoder 300 that may perform the techniques of this disclosure. FIG. 4 is provided for purposes of explanation and is not limiting on the techniques as broadly exemplified and described in this disclosure. For purposes of explanation, this disclosure describes video decoder 300 according to the techniques of VVC and HEVC. However, the techniques of this disclosure may be performed by video coding devices that are configured to other video coding standards.

In the example of FIG. 4, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry (e.g., integrated circuit). Moreover, video decoder 300 may include additional or alternative processors or processing circuitry (e.g., integrated circuit) to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry (e.g., integrated circuit) of video decoder 300.

The various units shown in FIG. 4 are illustrated to assist with understanding the operations performed by video decoder 300. The units may be implemented as fixed-function circuits, programmable circuits, or a combination thereof. Similar to FIG. 3, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 3).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 3). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures from DPB 314 for subsequent presentation on a display device, such as display device 118 of FIG. 1.

Figure 8:
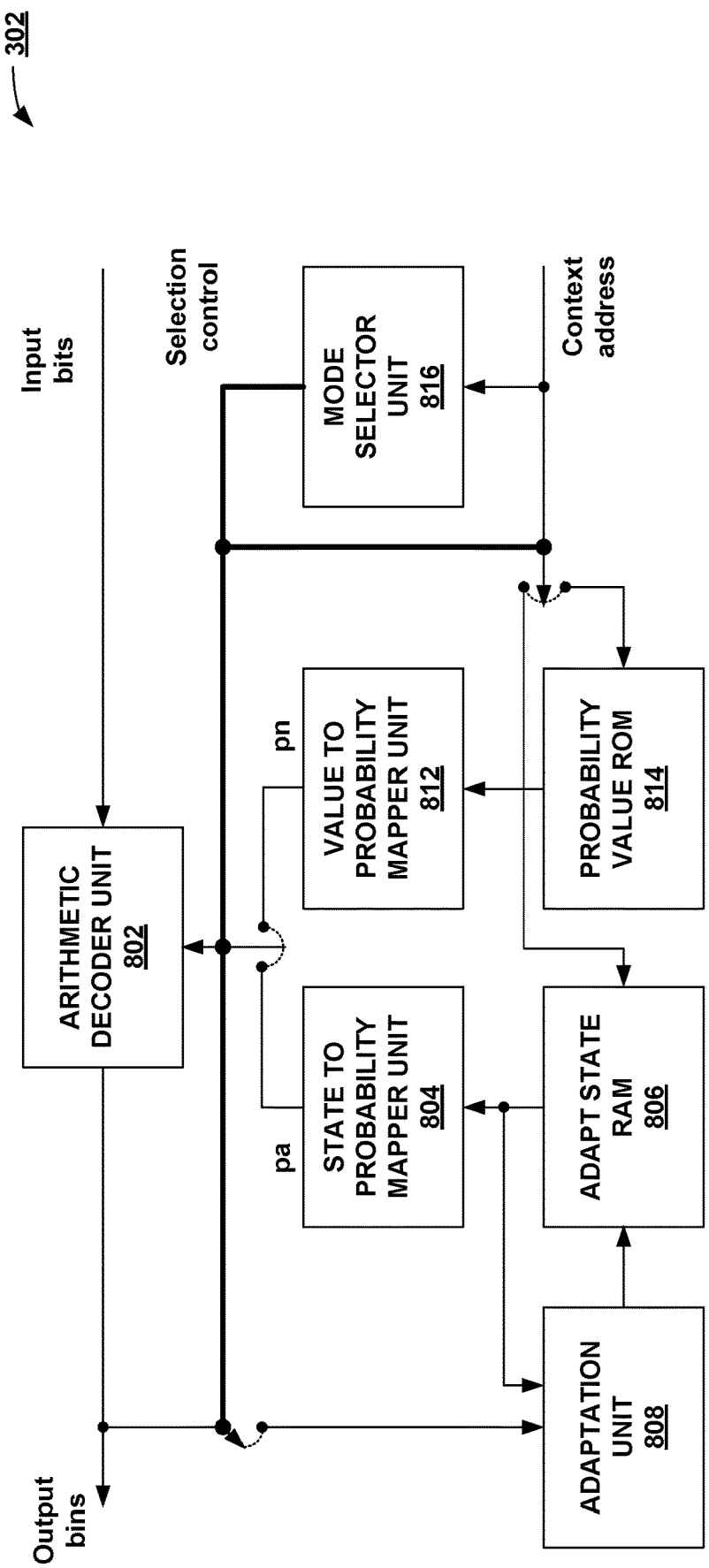
FIG. 8 is a conceptual diagram illustrating an example of a combination of adaptive and non-adaptive arithmetic decoders.

In accordance with techniques described in this disclosure, entropy decoding unit 302 may be configured to perform context-based decoding utilizing adaptive context models or non-adaptive context models. FIG. 8 illustrates an example of entropy decoding unit 302 in further detail, and illustrates example ways in which entropy decoding unit 302 may select between context-based decoding utilizing adaptive context models or non-adaptive context models. If context-based coding is not available (e.g., because of random probability of bin being zero or one), then entropy decoding unit 302 may be configured to perform bypass decoding.

Video decoder 300 represents an example of a video decoding device including a memory configured to store video data, and one or more processing units implemented as integrated circuitry (e.g., such as entropy decoding unit 302) and configured to decode first video data, for decoding a first block, based on an adaptive context model and decode second video data, for decoding a second block, based on a non-adaptive context model. As one example, to decode the first video data, the integrated circuit may decode the first video data using entropy coding with adaptive context models, and to decode the second video data, decode the second video data using entropy coding with non-adaptive context models. For instance, to decode the first video data using entropy coding, the integrated circuitry may context-based decode the first video data with adaptive context models, and to decode the second video data using entropy coding, the integrated circuit may context-based decode the second video data with non-adaptive context models.

For example, video decoder 300 (e.g., via entropy decoding unit 302) may determine whether the first video data is to be decoded using adaptive decoding or non-adaptive decoding and determine that the first video data is to be decoded using adaptive decoding. Video decoder 300 (e.g., via entropy decoding unit 302) may determine whether the second video data is to be decoded using adaptive decoding or non-adaptive decoding and determine that the second video data is to be decoding using non-adaptive decoding.

There may be various ways in which video decoder 300 may determine whether to decode using adaptive or non-adaptive decoding. As a few non-limiting examples, described in more detail below, video decoder 300 may determine whether the first video data is to be decoded using adaptive decoding or non-adaptive decoding based on at least one of: a context used to decode the first video data, frequency of use of the context model used to decode the first video data, stability of the context model used to decode the first video data, and comparison of the context used to decode the first video data to a threshold value. The same techniques may be utilized for determining whether the second video data is to be decoded using adaptive decoding or non-adaptive decoding.

For decoding the first video data using context-based coding with adaptive context models, video decoder 300 (e.g., via entropy decoding unit 302) may be configured to adapt (e.g., update) one or more context models based on previous output bins to generate one or more adapted context models and store the one or more adapted context models in a first memory (e.g., a fast memory such as a random-access memory including a register or an L1 cache). One example of adapting is changing information indicative of a probability being a 0 or a 1 based on the previous output bin. Then, when decoding the video data, video decoder 300 may read the one or more adapted context models from the first memory and context-based decode the first video data with the one or more adapted context models read from the first memory. In some examples, the adapting of the context model and the storing of the one or more adapted context models may have occurred previous to the coding of the first video data such that the adapted one or more context models are already stored in the memory.

For decoding the second video data using context-based coding with non-adaptive context models, video decoder 300 (e.g., via entropy decoding unit 302) may be configured to read one or more context models from a second memory (e.g., a ROM) and context-based decode the second video data with the one or more context models read from the second memory. For the non-adaptive context models, there may be no need to write or update, which allows the second memory to be read-only memory (ROM). Accordingly, the ROM may provide fast read access, but no write access, which allows the ROM to be sufficiently large to support many context models without a power penalty (e.g., without consuming a lot of power).

The following describes additional information related to development of coding of syntax elements. The HEVC video compression standard, as described in M. Wien, *High Efficiency Video Coding: Coding Tools and Specification*, Springer-Verlag, Berlin, 2015, uses a form of adaptive arithmetic coding that requires 8 bits of memory (RAM) for storing the state (e.g., context model) of each of its 202 coding contexts assigned to different syntax elements. The adaptive arithmetic coding for the upcoming VVC standard, as described in A. Said, M. Karczewicz, H. Egilmez, L. Zhang, and X. Zhao, "EE2: Arithmetic coding with context-dependent double-window adaptation response," Joint Video Exploration Team (JVET) of ITU-T SG16 WP3 and ISO/IEC JTC 1/SC29/WG11, Macao, CN, Input document JVET-H0061, October 2017 (hereinafter "JVET-H0061") and A. Said, J. Dong, H. Egilmez, Y-H. Chao, and M. Karczewicz, "CES: Per-context CABAC initialization with double windows," Joint Video Exploration Team (JVET) of ITU-T SG16 WP3 and ISO/IEC JTC 1/SC29/WG11, Marrakech, Input document JVET-M0412, January 2019 (hereinafter "JVET-M0412"), increases the memory requirement to 28 bits per context and employs 424 different context models. As arithmetic coding is computationally demanding on the components of video decoder 300, this 7-fold memory increase may limit the throughput and make implementation much more expensive.

To reduce the computational complexity of entropy coding in VVC, the disclosure exploits that only a fraction of the coding context models need the most powerful adaptation. This disclosure describes a hybrid entropy coding architecture, where the computations used for adaptation can be selectively disabled (e.g., such that entropy encoding unit 220 or entropy decoding unit 302 can selectively utilize context-based coding with adaptive context models or with non-adaptive context models). There may be one or more advantages to the example techniques described in this disclosure. A few examples of the advantages include: (a) the main arithmetic coding "engine" adopted in VVC does not need to be modified, (b) much less memory (e.g., 4 bits) is required per non-adaptive coding context model, and/or (c) the memory used for the non-adaptive context models can be much cheaper ROM (e.g., be stored in memory that does not require a lot of power). This disclosure also describes practical implementation of the example techniques to be used in the VVC standard.

Figure 5B:
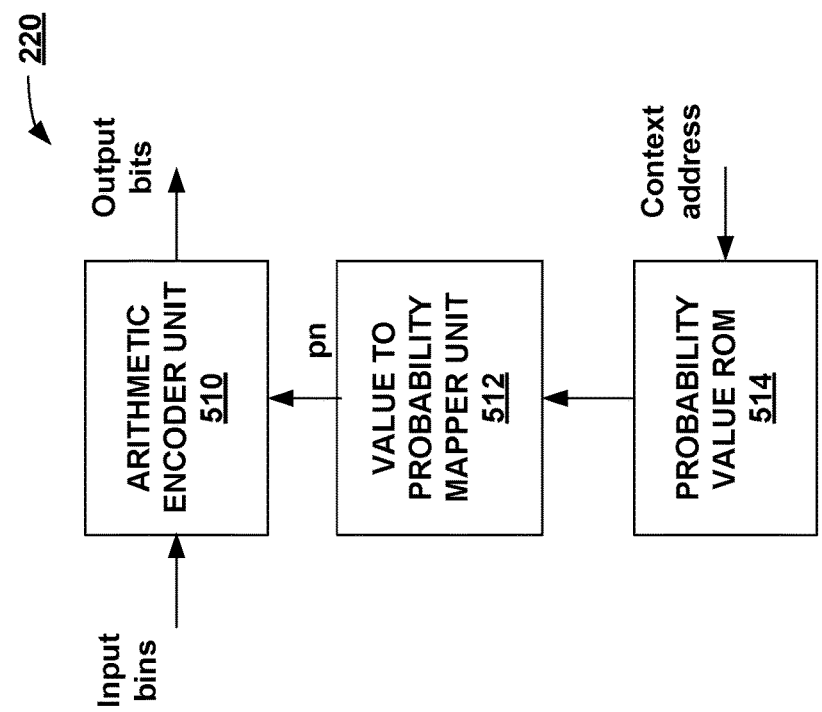
FIG. 5B is a conceptual diagram illustrating an example of a non-adaptive arithmetic encoder.
Figure 5A:
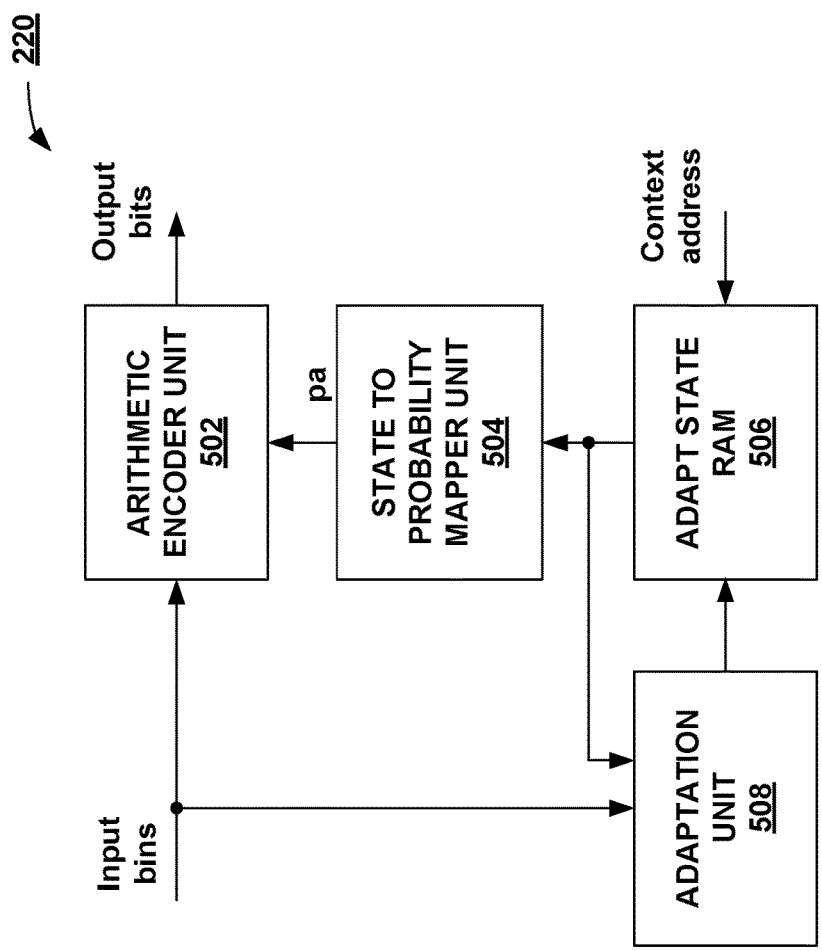
FIG. 5A is a conceptual diagram illustrating an example of an adaptive arithmetic encoder.
Figures 6A, 6B:
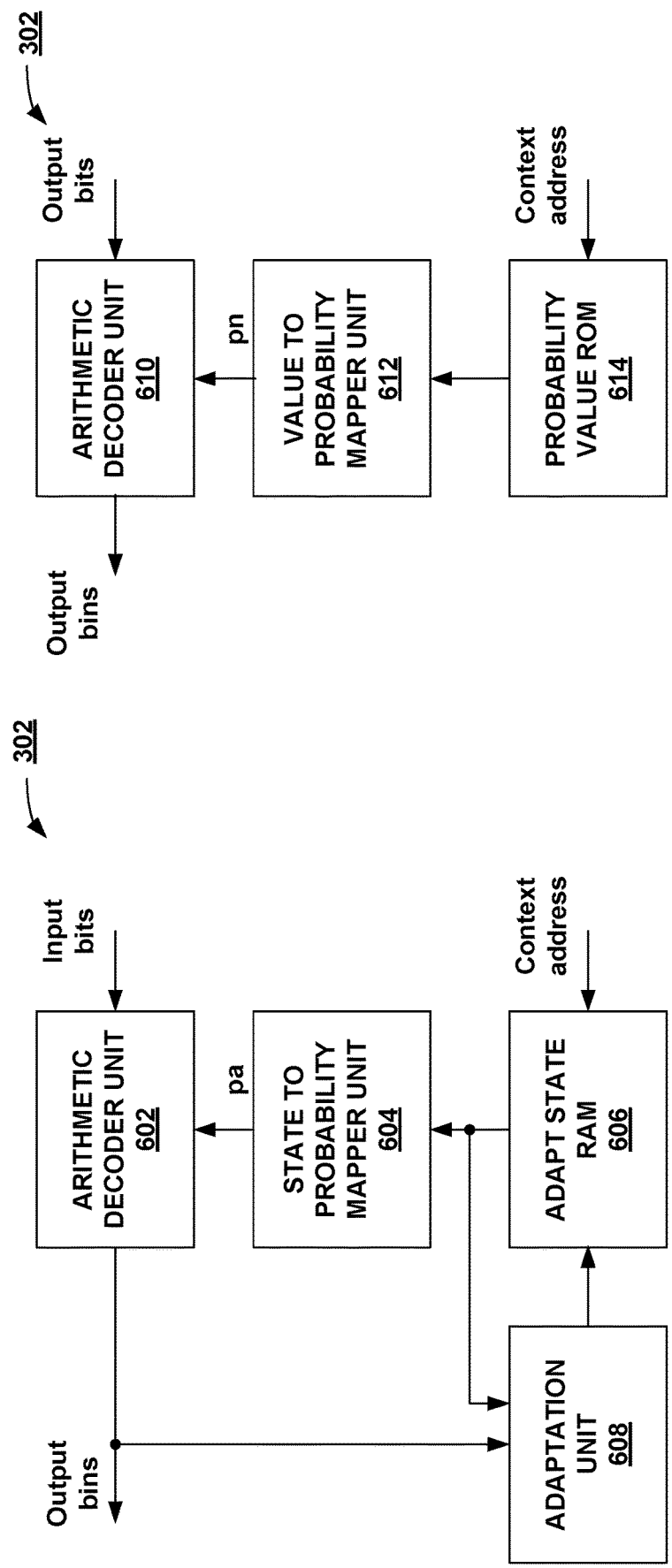
FIG. 6A is a conceptual diagram illustrating an example of an adaptive arithmetic decoder.
FIG. 6B is a conceptual diagram illustrating an example of a non-adaptive arithmetic decoder.

As described in more detail, FIGS. 5A, 5B, 6A, 6B, 7 and 8 illustrate examples for context-based arithmetic coding with adaptive context models (e.g., FIGS. 5A and 6A) or non-adaptive context models (e.g., FIGS. 5B and 6B). FIGS. 7 and 8 illustrate examples where context-based arithmetic coding with adaptive context models or with non-adaptive context models can be selected. FIGS. 5A, 5B, 6A, 6B, 7 and 8 illustrate various units that perform the example techniques. The various units of FIGS. 5A, 5B, 6A, 6B, 7 and 8 are illustrated to assist with understanding the operations performed for encoding and decoding. The units may be implemented in integrated circuitry as one or more fixed-function circuits, programmable circuits, or a combination thereof. Similar to above, fixed-function circuits refer to circuits that provide particular functionality, and are preset on the operations that can be performed. Programmable circuits refer to circuits that can be programmed to perform various tasks, and provide flexible functionality in the operations that can be performed.

In FIGS. 5A, 5B, and 7, the input is a plurality of input bins. For instance, a syntax element may have been binarized into a string of bins (e.g., using Exponential-Golomb binarization). Binarization is not required in all examples, and when binarization is not performed, each bit in the string of bits representing a value of the syntax element may be considered as an input bin. The output, in FIGS. 5A, 5B, and 7, is output bits representing the encoded syntax elements that may form part of the bitstream that is signaled.

In FIGS. 6A, 6B, and 8, the input is a plurality of input bits (e.g., bitstream received from video encoder 200) representing the encoded syntax elements that may form part of the bitstream that is signaled. The output, in FIGS. 6A, 6B, and 8, is output bins which are the decoded syntax elements. In examples where binarization is utilized by video encoder 200, the output bins may be de-binarized to generate the value of the syntax element. However, where binarization is not performed, the output bins may be the output bits representing the value of the syntax element.

FIG. 5A is a conceptual diagram illustrating an example of an adaptive arithmetic encoder. FIG. 6A is a conceptual diagram illustrating an example of an adaptive arithmetic decoder. FIG. 5A may be considered as one example of entropy encoding unit 220, and FIG. 6A may be considered as one example of entropy decoding unit 302. For instance, FIGS. 5A and 6A show diagrams of the forms of adaptive binary entropy coding used in the HEVC video compression standard and that may be part of the VVC standard.

For each encoded and decoded bin (binary symbol) (e.g., of video data, such as a syntax element), an estimate of the probability of the bin value is computed by the adaptation unit 508 of FIG. 5A or adaptation unit 608 of FIG. 6A and used for encoding and decoding. JVET-M0412 and JVET-H0061 may provide related information. After the bin is encoded or decoded, the state of the adaptation unit 508 or 608 is updated using the value of the last bin.

For example, adaptation state RAM 506 receives a context address that identifies the type of syntax element (e.g., type of image data) that is being encoded and the context address forms an index into adaptation state RAM 506 to identify one or more context models. Adaptation unit 508 reads the one or more context models from RAM 506 and adapts the one or more context models based on the actual bin value and stores the updated context models into RAM 506. One example of adapting is changing information indicative of a probability being a 0 or a 1 based on the actual bin value. In this way, coding video data with context-based coding with adaptive context models includes adapting (e.g., with adaptation unit 508) one or more context models based on a previous input bin to generate one or more adapted context models and storing the one or more adapted context models in RAM 506. Then, when coding the video data, arithmetic encoder unit 502 reads the one or more adapted context models from RAM 506, which may include a probability value (pa), and context-based encodes (e.g., using CABAC) the syntax element with the one or more adapted context models read from RAM 506 (e.g., using the probability value (pa)).

Similarly, for decoding in FIG. 6A, adaptation state RAM 606 receives a context address that identifies the type of video data (e.g., type of syntax element) that is being decoded and the context address forms an index into adaptation state RAM 606 to identify one or more context models. Adaptation unit 608 reads the one or more context models from RAM 606 and adapts the one or more context models based on the actual bit value and stores the updated context models into RAM 606. One example of adapting is changing information indicative of a probability being a 0 or a 1 based on the actual bin. In this way, coding video data with context-based coding with adaptive context models includes adapting (e.g., with adaptation unit 608) one or more context models based on a previous output bin to generate one or more adapted context models and storing the one or more adapted context models in RAM 606. Then, when coding the video data, arithmetic decoder unit 602 reads the one or more adapted context models, which may include a probability value (pa), from RAM 606 and context-based decodes (e.g., using CABAC) the video data with the one or more adapted context models read from RAM 606 (e.g., using the probability value (pa)).

FIG. 5A illustrates state to probability mapper unit 504 and FIG. 6A illustrates state to probability mapper unit 604. Unit 504 and unit 604 are optional. For example, in some cases, rather than outputting a probability value (pa), RAM 506 or RAM 606 may output a codeword and unit 504 and unit 604 may map the codeword to a probability value. The use of unit 504 and 604 may provide memory gains because not all probability values may be needed. For instance, if assuming increments of tenths, there may be 10 probability values (e.g., 0.1, 0.2, 0.3 . . . 0.9, and 1). Unit 504 and unit 604 may map a codeword output from RAM 506 or RAM 606 to one of the 10 probability values. In examples where unit 504 and unit 604 are utilized, the output from unit 504 and unit 604 may be a probability value (pa).

FIG. 5B is a conceptual diagram illustrating an example of a non-adaptive arithmetic encoder. FIG. 6B is a conceptual diagram illustrating an example of a non-adaptive arithmetic decoder. For instance, the non-adaptive form of arithmetic coding, shown in FIGS. 5B and 6B, has lower computational complexity because it does not require the computations and memory read/write operations used by an adaptation unit (e.g., like adaptation unit 508 or adaptation unit 608). The form of arithmetic coding represented in FIGS. 5B and 6B may have inferior compression performance.

Similar to FIGS. 5A and 6A, in FIGS. 5B and 6B, probability value ROM 514 or ROM 614 receive a context address that identifies one or more context models in ROM 514 or ROM 614. The context models may include a probability value (pn) that arithmetic encoder unit 510 or arithmetic decoder unit 610 may utilize to perform arithmetic encoding or arithmetic decoding.

FIGS. 5B and 6B illustrate value to probability mapper unit 512 and value to probability mapper unit 612. Similar to units 504 and 604, units 512 and 612 may be optional. For instance, ROM 514 or ROM 614 may output a codeword and unit 512 and unit 612 may map that codeword to a probability value (pn).

One issue with arithmetic coding in the past has been the computational cost of the required arithmetic operations (especially multiplications), probability estimation, and data re-arrangement that needs to be performed by arithmetic encoder units 502 or 510 or arithmetic decoder units 602 or 610. With new hardware technologies these problems are now less important. However, the cost of accessing memory is an issue that impacts operation video encoder 200 and video decoder 300.

Memory access may be an issue because advanced video compression requires a large number of coding context models, and a certain amount of memory is needed for each context model. Since arithmetic coding is a component that can impact the throughput of video encoder 200 and video decoder 300, context model information may be beneficially stored in very fast memory, which tends to be much more expensive than the "normal" memory. For example, RAM 506 or RAM 606 requires much more power to operate than ROM 514 or ROM 614.

One method to reduce the need for coding context models, while keeping the same arithmetic coding engine, is to use the "bypass" mode, that assumes that the bin values are equally probable. However, since this can degrade compression performance, if a coding context model is used, it commonly means that the compression performance of the bypass mode has already been tested and may not provide adequate compression.

This disclosure describes example techniques that potentially enable a significant reduction in memory costs with only a small reduction (e.g., minimal or negligible) in compression efficiency. Adaptation to arithmetic coding may be added with small fast finite-state machines, with the complexity related to the arithmetic operations and other operations like re-normalization and bit re-arrangement.

However, features of non-adaptive arithmetic coding may also be important. The amount of memory per context used by the non-adaptive encoder or decoder is significantly smaller. For instance, the VVC arithmetic coding engine cannot use more than 6 bits of precision for probability values, because that is the number used to perform multiplications. In contrast, the adaptive context models need 28 bits per context model to update its probability estimation, but only the 6 most significant bits of the estimated probability are used for coding.

In accordance with examples described in this disclosure, since the probability values (e.g., from the context models) to be used for some of the context models are fixed, the probability values associated with contexts can be read from ROM (e.g., ROM 514 or ROM 614). This may be useful for the video coding application and custom hardware decoders because, for the memory speed required for video, ROM is much cheaper (e.g., consumes less power) than equivalently fast RAM.

To exploit these properties, this disclosure describes using a hybrid system that combines the adaptive and the non-adaptive forms of arithmetic coding into a single system, with the possibility of changing the type of coding depending on the context. In other words, the same arithmetic coding engine employs adaptation for some contexts and skips adaptation for others. Accordingly, video encoder 200 (e.g., entropy encoding unit 220) may be configured to perform adaptive encoding (e.g., context-based arithmetic coding with adaptive context models) and non-adaptive encoding (e.g., context-based arithmetic coding with non-adaptive context models). Video decoder 300 (e.g., entropy decoding unit 302) may be configured perform adaptive decoding (e.g., context-based arithmetic coding with adaptive context models) and non-adaptive decoding (e.g., context-based arithmetic coding with non-adaptive context models).

FIG. 7 is a conceptual diagram illustrating an example of a combination of adaptive and non-adaptive arithmetic encoders. FIG. 8 is a conceptual diagram illustrating an example of a combination of adaptive and non-adaptive arithmetic decoders. For instance, FIGS. 7 and 8 show diagrams of example encoding and corresponding decoding systems. In the example of FIGS. 7 and 8, the decision to use one type or another is inferred directly from the context address. For instance, the adaptive version is used if the address is below a certain value, and otherwise the non-adaptive version is used. However, the example of FIGS. 7 and 8 is one example, and there may be other criteria that may be used in addition to or instead of the context address. Any combination of the criteria to determine whether adaptive or non-adaptive arithmetic coding may be used. The following describes some examples of alternative or additional selection methods that can be shared by video encoder 200 and video decoder 300.

FIG. 7 illustrates an example of entropy encoding unit 220, in accordance with one or more examples described in this disclosure. As illustrated, entropy encoding unit 220 includes arithmetic encoder unit 702, state to probability mapper unit 704, adaptation state RAM 706, adaptation unit 708, value to probability mapper unit 712, probability value ROM 714, and mode selector unit 716. RAM 706 and ROM 714 are examples of a plurality of memories of entropy encoding unit 220. The input bins to arithmetic encoder unit 702 represent bins that represent a syntax element and the output bits from arithmetic encoder unit 702 are the encoded bits representing the syntax element.

In one or more examples, mode selector unit 716 may be configured to determine whether video data (e.g., a syntax element) for coding a block, represented by the input bins, is to be encoded using context-based encoding with adaptive context models or with non-adaptive context models. As one example, mode selector unit 716 receives a context address used to identify one or more context models stored in RAM 706 or ROM 714. RAM 706 may be memory that can be read from and written to relatively quickly, such as registers or L1 cache, and is therefore constrained on size. ROM 714 is a memory that can be read relatively quickly but data does not need to be written to it. In general, ROM 714 requires less power than RAM 706, and can have a large size (e.g., store more values) than RAM 706.

If the context model is stored in RAM 706, then arithmetic encoder unit 702 may receive the context model from RAM 706 (possibly with codeword to probability mapping with mapper unit 704 if mapper unit 704 is used) and perform arithmetic encoding to generate the output bits. In one or more examples, the context model that is read from RAM 706 may be have been adapted by a previous bin. For example, adaptation unit 708 may have adapted one or more context models based on previous input bins to generate one or more adapted context models and store the one or more adapted context models in a memory (e.g., RAM 706). Then, mapper unit 704 (if used) or arithmetic encoder unit 702 may read the one or more adapted context models from the memory (e.g., RAM 706) and context-based encode the video data with the one or more adapted context models read from the memory (e.g., RAM 706). For example, arithmetic encoder unit 702 may utilize the probability value (pa) to perform the encoding. Adaptation unit 708 may then further update the adapted context model based on the current value of the input bin and store the result in RAM 706 such that the next time the context model is used, the further updated context model is used.

If the context model is stored in ROM 714, then arithmetic encoder unit 702 may receive the context model from ROM 714 (possibly with codeword to probability mapping with mapper unit 712 if mapper unit 712 is used) and perform arithmetic encoding to generate the output bits. For example, mapper unit 712 (if used) or arithmetic encoder unit 702 may read one or more context models from memory (e.g., ROM 714) and context-based encode (e.g., based on non-adaptive context models) the video data with one or more context models read from memory (e.g., ROM 714). For example, arithmetic encoder unit 702 may utilize the probability value (pn) to perform the encoding. Since the context models stored in ROM 714 are not updated (e.g., adapted), there may be no change to the context model stored in ROM 714.

FIG. 8 illustrates an example of entropy decoding unit 302, in accordance with one or more examples described in this disclosure. As illustrated, entropy decoding unit 302 includes arithmetic decoder unit 802, state to probability mapper unit 804, adaptation state RAM 806, adaptation unit 808, value to probability mapper unit 812, probability value ROM 814, and mode selector unit 816. RAM 806 and ROM 814 are examples of a plurality of memories of entropy decoding unit 302. The input bits to arithmetic decoder unit 802 represent bits that represent encoded video data and the output bins from arithmetic decoder unit 802 are the decoded bins representing the video data.

In one or more examples, mode selector unit 816 may be configured to determine whether video data, represented by the input bits, is to be encoded using context-based decoding with adaptive context models or with non-adaptive context models. As one example, mode selector unit 816 receives a context address used to identify one or more context models stored in RAM 806 or ROM 814. RAM 806 may be memory that can be read from and written to relatively quickly, such as registers or L1 cache, and is therefore constrained on size. ROM 814 is a memory that can be read relatively quickly but data does not need to be written to it. In general, ROM 814 requires less power than RAM 806, and can have a large size (e.g., store more values) than RAM 806.

If the context model is stored in RAM 806, then arithmetic decoder unit 802 may receive the context model from RAM 806 (possibly with codeword to probability mapping with mapper unit 804 if mapper unit 804 is used) and perform arithmetic decoding to generate the output bins. In one or more examples, the context model that is read from RAM 806 may have been adapted based on a previous bin. For example, adaptation unit 808 may have adapted one or more context models based on previous output bins to generate one or more adapted context models and store the one or more adapted context models in a memory (e.g., RAM 806). Then, mapper unit 804 (if used) or arithmetic decoder unit 802 may read the one or more adapted context models from the memory (e.g., RAM 806) and context-based decode the video data with the one or more adapted context models read from the memory (e.g., RAM 806). For example, arithmetic decoder unit 802 may utilize the probability value (pa) to perform the decoding. Adaptation unit 808 may then further update the adapted context model based on the current value of the output bin and store the result in RAM 806 such that the next time the context model is used, the further updated context model is used.

If the context model is stored in ROM 814, then arithmetic decoder unit 802 may receive the context model from ROM 814 (possibly with codeword to probability mapping with mapper unit 812 if mapper unit 812 is used) and perform arithmetic decoding to generate the output bins. For example, mapper unit 812 (if used) or arithmetic decoder unit 802 may read one or more context models from memory (e.g., ROM 814) and context-based decode (e.g., based on non-adaptive context models) the video data with one or more context models read from memory (e.g., ROM 814). For example, arithmetic decoder unit 802 may utilize the probability value (pn) to perform the decoding. Since the context models stored in ROM 814 are not updated (e.g., adapted), there may be no change to the context model stored in ROM 814.

In the above examples, the context address is used to identify whether video data is to be encoded or decoded with context-based coding with adaptive context models or non-adaptive context models. However, the example techniques are not so limited. Encoding or decoding with non-adaptive context models tends to be faster than with adaptive context models because adaptation unit 708 or adaptation unit 808 utilize clock cycles updating context models that are not needed with non-adaptive context models.

In some examples, mode selector unit 716 and mode selector unit 816 may track how much video data has been encoded or decoded using adaptive context models. If the amount of video data that has been encoded or decoded using adaptive context models becomes too high, mode selector unit 716 and mode selector unit 816 may select non-adaptive context models for encoding or decoding until a ratio of video data that are encoded or decoded with adaptive context models to a number of video data that are encoded or decoded with non-adaptive context models reaches a threshold range, e.g., drops to be equal to or less than a threshold value.

As another example, mode selector unit 716 and mode selector unit 816 may determine that a number of times that context-based coding with adaptive context models is used is greater than or equal to a threshold value. In response, mode selector unit 716 and mode selector unit 816 may select coding with non-adaptive context models. For example, arithmetic encoder unit 702 or arithmetic decoder unit 802 may encode or decode video data using context-based coding with non-adaptive context models based on the determination that the number of times that context-based coding with adaptive context models is used in greater than or equal to the threshold value.

There may be various reasons why some context models are adaptive and some are non-adaptive. The context models that can be selected for being non-adaptive can be, for example, context models that are used less frequently, since they do not affect compression much or context models that have bin value probabilities that are relatively stable. An example of a relatively stable context model is a context model that tends not to change much during the coding of a slice or picture (e.g., as determined from training). For relatively stable context models, an initial context model may be selected that does not then change. There may also be methods, based on training, for doing the optimal selection, and various training techniques may be used.

Accordingly, there may be various ways in which to determine whether video data is to be context-based coded with adaptive context models or to be context-based coded with non-adaptive context models such as based on one or more of a context of the video data (e.g., type of data being coded), frequency of use of the context model of the video data, stability of the context model used to code the video data, and comparison of the context to a threshold value.

The following describes some examples of implementing the example techniques with video encoder 200 or video decoder 300. The example techniques for implementation are provided merely as examples and should not be considered limiting.

The actual implementation of mode selector unit 716 and mode selector unit 816 can be efficiently done in several ways. Since the number assigned for a context model is arbitrary, but ensured that video encoder 200 and video decoder 300 select the same context model by defining the order in which video data are coded, it may be possible to sort the context models so that those that are non-adaptive come first. This way, the identification can be done by comparing the context number to a fixed value (e.g., threshold value). This value (e.g., fixed value or threshold value) can be fixed by the video compression standard or encoded together with the video (e.g., video encoder 200 signals to video decoder 300 the threshold value).

If the context models are sorted in a different way, an array of bits (424 bits in the case of VVC) can identify the context models that are non-adaptive. Those bits can be fixed by the video compression standard or encoded together with the video (e.g., video encoder 200 signals to video decoder 300 the bits that identify the contexts that are non-adaptive). Also, rather than identifying non-adaptive context models, it may be possible to use bits to identify adaptive context models.

A video coding standard may define the initial probability value for each adaptive context model, which is based on quantization parameter (QP) and slice type (I, B, or P). The video coding standard may also define a value for the non-adaptive context models. In some examples, video encoder 200 may signal to video decoder 300 the probability values for the context models including the adaptive and non-adaptive contexts models.

Using different values for each slice type may be one way to define the different non-adaptive context models, as it corresponds to three different tables. The dependence on QP, may need to be modified. For adaptive contexts, there is a formula that maps continuously the standardized initialization parameters to probability values, and there may be many probability values for the different QP values.

This may cause a problem when the probabilities for the non-adaptive context models are stored in ROM 714 and ROM 814, since a large amount of memory may be needed for all the values. One example technique to address the large amount of needed memory is to divide the range of allowed QP values into a few intervals, and create different ROMs 714 and ROMs 814 for each of those intervals, as in the example below.

| Condition | Standard | Hardware |
| --- | --- | --- |
| 0 ≤ QP < 16 | Initialization table 1 | ROM-0 |
| 16 ≤ QP < 32 | Initialization table 2 | ROM-1 |
| 32 ≤ QP < 48 | Initialization table 3 | ROM-2 |
| 48 ≤ QP < 64 | Initialization table 4 | ROM-3 |

Stated another way, information of a manner in which a current block of the video data is coded may be a factor in determining which context model to use. Examples of the information of the manner in which the current block of video data is coded includes at least one of a quantization parameter (QP) for the current block and a prediction mode for the current block (e.g., prediction mode is inter-prediction or intra-prediction).

In some examples, ROM 714 and ROM 814 may be a plurality of ROMs (e.g., ROM 714-1 to 714-N and ROM 814-1 to 814-N). The plurality of ROMs may be partitions of a same large ROM or separate ROMs. Each of the plurality of ROMs may be associated with a particular information of the manner in which the current block of video data is coded. For example, ROM 714-1 and ROM 814-1 may store context models for QP less than 16, ROM 714-2 and ROM 814-2 may store context models for QP less than 32 and greater than or equal to 16, ROM 714-3 and ROM 814-3 may store context models for QP less than 48 and greater than or equal to 32. and ROM 714-4 and ROM 814-4 may store context models for QP less than 64 and greater than or equal to 48.

Accordingly, in one or more examples, mode selector unit 716 or mode selector unit 816 may determine information of a manner in which a current block of the video data is coded. Mode selector unit 716 or mode selector unit 816 may select a location to read from in a memory based on the determined information (e.g., selecting which of ROMs 714-1 to 714-N or ROMs 814-1 to 814-N to read from). Arithmetic encoder unit 702 or arithmetic decoder unit 802 may read one or more context models from the selected location (or through mapper unit 712 and mapper unit 812 if used) and context-based binary code the video data with the one or more context models read from the memory (e.g., from one of ROMs 714-1 to 714-N or ROMs 814-1 to 814-N).

Another aspect is the mapping of context bit values into probabilities. This map may not have to be linear, and tables can be used to avoid expensive computations. The table below shows an example, where two bits are used per context, and those are mapped into probabilities.

| Bits | Probability (bin = 1) |
|------|------------------------|
| 00   | 0.02                   |
| 01   | 0.1                    |
| 10   | 0.9                    |
| 11   | 0.98                   |

For example, the table is an example of operation by value to probability mapper unit 712 or value to probability mapper unit 812. If mapper unit 712 or mapper unit 812 receives bits 00, then mapper unit 712 or mapper unit 812 output a probability value of 0.02. If mapper unit 712 or mapper unit 812 receives bits 01, then mapper unit 712 or mapper unit 812 output a probability value of 0.1. If mapper unit 712 or mapper unit 812 receives bits 10, then mapper unit 712 or mapper unit 812 output a probability value of 0.9. If mapper unit 712 or mapper unit 812 receives bits 11, then mapper unit 712 or mapper unit 812 output a probability value of 0.98. Mapper unit 704 and 804 may operate in a similar manner.

Figure 9:
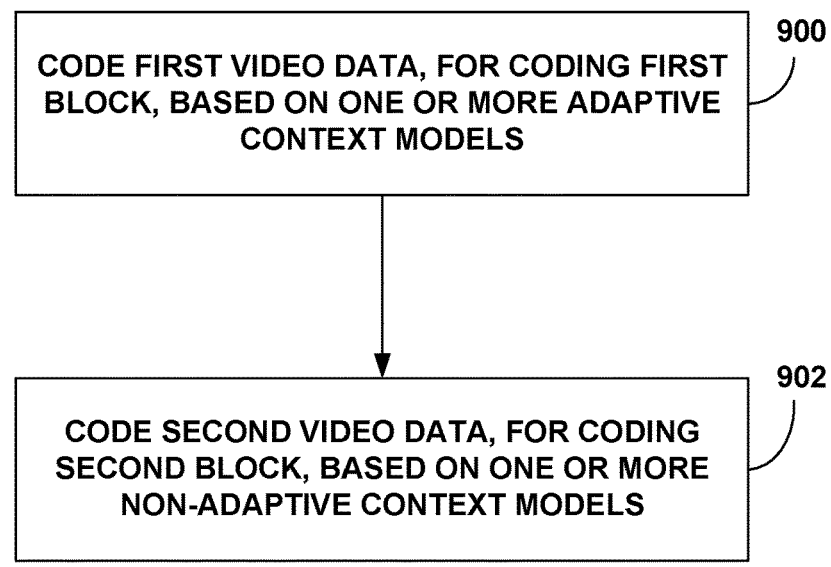
FIG. 9 is a flowchart illustrating an example method of coding video data.

FIG. 9 is a flowchart illustrating an example method for coding video data. The example techniques are described with respect to an integrated circuit of a video coder. The integrated circuit may be fixed-function circuitry, programmable circuitry, or a combination thereof. Examples of the video coder include video encoder 200 or video decoder 300.

There may be one or more memories configured to store context models. For instance, there may be RAM 706 and ROM 714 of video encoder 200 for storing context models. There may be RAM 806 and ROM 814 of video decoder 300 for storing context models. As described above, in some examples, ROM 714 may be a plurality of ROMs and ROM 814 may be a plurality of ROMs, where each ROM is associated with information indicative of a manner in which a current block of the video data is coded. Examples of the information of the manner in which the current block of the video data is coded include at least one of a quantization parameter for the current block and a prediction mode for the current block.

The integrated circuit of the video coder may be configured to code first video data, for coding a first block, based on an adaptive context model (900). One example of coding the first video data based on an adaptive context model includes encoding the first video data based on an adaptive context model. One example of coding the first video data based on an adaptive context model includes decoding the first video data based on an adaptive context model.

The integrated circuit of the video coder may determine whether to code the first video data using context-based coding with adaptive context models or using context-based coding with non-adaptive context models based on one or more of a context of the first video data, frequency of use of the context model of the first video data, stability of the context model used to code the first video data, and comparison of the context to a threshold value. In this example, based on one or more of the above factors, the integrated circuit determined to code the first video data using context-based coding with adaptive context models.

To code the first video data in the bitstream using context-based coding with adaptive context models, the integrated circuit of the video coder may be configured to adapt one or more context models based on at least one of previous input bins or previous output bins to generate one or more adapted context models, store the one or more adapted context models in a memory, read the one or more adapted context models from the memory, and context-based code the first video data with the one or more adapted context models read from the memory. The adapting of the context model and the storing of the one or more adapted context models may have occurred previous to the coding of the first video data such that the adapted one or more context models are already stored in the memory. The memory may be random access memory such as RAM 706 or RAM 806.

The integrated circuit of the video coder may be configured to code second video data, for coding a second block, based on one or more non-adaptive context models (902). One example of coding second video data in the bitstream using context-based coding based on one or more non-adaptive context models includes encoding the second video data based on one or more non-adaptive context models. One example of coding the second video data based on one or more non-adaptive context models includes decoding the second video data based on one or more non-adaptive context models.

To code the second video data using context-based coding with non-adaptive context models, the integrated circuit may be configured to read one or more context models from a memory and context-based code the second video data with the one or more context models read from the memory. The memory may be read only memory (ROM), such as ROM 714 or ROM 814.

In some examples, to code the second video data with non-adaptive context models, the integrated circuit may be configured to determine information of a manner in which a current block of the video data is coded, select a location to read from in a memory based on the determined information, read one or more context models from the selected location, and context-based binary code the second video data with the one or more context models read from the memory. For example, as described above, in some examples, ROM 714 and ROM 814 may be a plurality of ROMs that are each associated with information of a manner in which the current block is coded, such as the quantization parameter or prediction mode of the current block. The integrated circuit may identify which of the ROMs to read from (e.g., to select a location to read from in memory) based on the information of the manner in which the current block is coded and read one or more context models from the selected location (e.g., selected ROM).

As another example, the integrated circuit may determine that a number of times that context-based coding with adaptive context models is used is greater than or equal to a threshold value. In such examples, to code the second video data in the bitstream using context-based coding with non-adaptive context models, the integrated circuit may be configured to code the second video data using context-based coding with non-adaptive context models based on the determination that the number of times that context-based coding with adaptive context models is used is greater than or equal to the threshold value.

The following describe one or more example techniques of this disclosure. The example techniques may be used alone or in combination.

Example 1. A method of decoding video data, the method comprising decoding a first syntax element in a bitstream using adaptive binary arithmetic decoding and decoding a second syntax element in the bitstream using non-adaptive binary arithmetic decoding.

Example 2. The method of example 1, further comprising determining whether the first syntax element is to be decoded using adaptive binary arithmetic decoding or non-adaptive binary arithmetic decoding and determining that the first syntax element is to be decoded using adaptive binary arithmetic decoding.

Example 3. The method of any of examples 1 and 2, further comprising determining whether the second syntax element is to be decoded using adaptive binary arithmetic decoding or non-adaptive binary arithmetic decoding and determining that the second syntax element is to be decoded using non-adaptive binary arithmetic decoding.

Example 4. The method of any of examples 2 and 3, wherein determining whether the first syntax element is to be decoded using adaptive binary arithmetic decoding or non-adaptive binary arithmetic decoding comprises determining whether the first syntax element is to be decoded using adaptive binary arithmetic decoding or non-adaptive binary arithmetic decoding based on at least one of: a context address for a context used to decode the first syntax element, frequency of use of the context used to decode the first syntax element, stability of the context used to decode the first syntax element, and comparison of the context used to decode the first syntax element to a threshold value.

Example 5. The method of any of examples 2-4, wherein determining whether the second syntax element is to be decoded using adaptive binary arithmetic decoding or non-adaptive binary arithmetic decoding comprises determining whether the second syntax element is to be decoded using adaptive binary arithmetic decoding or non-adaptive binary arithmetic decoding based on at least one of: a context address for a context used to decode the second syntax element, frequency of use of the context used to decode the second syntax element, stability of the context used to decode the second syntax element, and comparison of the context used to decode the second syntax element to a threshold value.

Example 6. A method of encoding video data, the method comprising encoding a first syntax element in a bitstream using adaptive binary arithmetic encoding and encoding a second syntax element in the bitstream using non-adaptive binary arithmetic encoding.

Example 7. The method of example 6, further comprising determining whether the first syntax element is to be encoded using adaptive binary arithmetic encoding or non-adaptive binary arithmetic encoding and determining that the first syntax element is to be encoded using adaptive binary arithmetic encoding.

Example 8. The method of any of examples 6 and 7, further comprising determining whether the second syntax element is to be encoded using adaptive binary arithmetic encoding or non-adaptive binary arithmetic encoding and determining that the second syntax element is to be encoded using non-adaptive binary arithmetic encoding.

Example 9. The method of any of examples 7 and 8, wherein determining whether the first syntax element is to be encoded using adaptive binary arithmetic encoding or non-adaptive binary arithmetic encoding comprises determining whether the first syntax element is to be encoded using adaptive binary arithmetic encoding or non-adaptive binary arithmetic encoding based on at least one of: a context address for a context used to encode the first syntax element, frequency of use of the context used to encode the first syntax element, stability of the context used to encode the first syntax element, and comparison of the context used to encode the first syntax element to a threshold value.

Example 10. The method of any of examples 7-9, wherein determining whether the second syntax element is to be encoded using adaptive binary arithmetic encoding or non-adaptive binary arithmetic encoding comprises determining whether the second syntax element is to be encoded using adaptive binary arithmetic encoding or non-adaptive binary arithmetic encoding based on at least one of: a context address for a context used to encode the second syntax element, frequency of use of the context used to encode the second syntax element, stability of the context used to encode the second syntax element, and comparison of the context used to encode the second syntax element to a threshold value.

Example 11. A device for decoding video data, the device comprising a memory configured to video data and a video decoder comprising at least one of fixed-function or programmable circuitry, wherein the video decoder is configured to perform the method of any of examples 1-5.

Example 12. A device for encoding video data, the device comprising a memory configured to video data and a video encoder comprising at least one of fixed-function or programmable circuitry, wherein the video encoder is configured to perform the method of any of examples 6-10.

Example 13. The device of any of examples 11 and 12, wherein the device further comprises one or more of a device to display decoded video data, a camera, a computer, a mobile device, a broadcast receiver device, or a set-top box.

Example 14. A device for decoding video data, the device comprising means for performing the method of any of examples 1-5.

Example 15. A device for encoding video data, the device comprising means for performing the method of any of examples 6-10.

Example 16. A computer-readable storage medium having stored thereon instructions that, when executed, cause one or more processors to perform the method of any of examples 1-5 or 6-10.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "integrated circuit," "processor," and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of coding video data, the method comprising:

determining information bits associated with a first block of video data;

comparing the information bits being equal to or being greater than a threshold value, entropy coding the first block of video data-based on one or more adaptive context models that are stored in the RAM, when the one or more adaptive context models are read accessed from the RAM, and storing the entropy coded first block of video data in the RAM;

determining a quantization parameter associated with a second block of video data;

performing a comparison between the quantization parameter and a fixed value to switch between read accessing one or more adapted context models from a random access memory (RAM), and read accessing one or more non-adaptive context models from a read only memory (ROM); and entropy coding the second block of video data based on the one or more non-adaptive context models stored in the ROM, when the one or more non-adaptive context models are read accessed from the ROM.

2. The method of claim 1, wherein the entropy coding the first block of video data comprises coding the first block of video data using context-based arithmetic coding with the one or more adaptive context models stored in the RAM, and wherein entropy coding the second block of video data comprises coding the second block of video data using context-based arithmetic coding with the one or more non-adaptive context models stored in the ROM.

3. The method of claim 1, wherein the first block of video data and the second block of video data are in the same picture or slice.

4. The method of claim 1, wherein the first block of video data and the second block of video data are in different pictures or slices.

5. The method of claim 1, wherein the entropy coding the first block of video data further comprises:

adapting the one or more adaptive context models based on at least one of previous input bins or previous output bins to generate the one or more adapted context models and stored in the RAM; and context-based arithmetic coding the first block of video data with the one or more adapted context models read from the RAM.

6. The method of claim 1, wherein the entropy coding the second block of video data further comprise context-based arithmetic coding the second block of video data with the one or more non-adaptive context models read from the ROM.

7. The method of claim 1, wherein the entropy coding the second block of video data and the read accessing of the non-adaptive context models from the ROM further comprises:

selecting a location to read access from the ROM based on the quantization parameter before read accessing of the one or more non-adaptive context models from the selected location; and context-based binary coding the second block of video data with the one or more non-adaptive context models read accessed from the ROM.

8. The method of claim 1, further comprising:
determining whether to entropy code the first block of video data based on the one or more adaptive context models based on one or more of:
a one or more contexts of the first block of video data;
frequency of use of the one or more adaptive context models stored in the RAM of the first block of video data;
stability of the one or more adaptive context models stored in the RAM used to entropy code the first video data; and
comparison of the one or more adaptive contexts in the RAM to the threshold value.

9. The method of claim 1,
wherein the entropy coding the first block of video data comprises encoding the first block of video data based on the one or more adaptive context models stored in the RAM, and
wherein the entropy coding the second block of video data comprises encoding the second block of video data based on the one or more non-adaptive context models stored in the ROM.

10. The method of claim 1, further comprising receiving in a slide header a quantization parameter (QP) and a per slice type.

11. The method of claim 10, further comprising a QP range value based on the quantization parameter, wherein the QP range value is divided into two or more intervals, and based on the two or more intervals, the one or more non-adaptive context models are read from two or more ROMs.

12. The method of claim 11, wherein the QP range value is incudes the value of 64.

13. The method of claim 10, wherein the QP is based on a slice type of I, P or B, included in a slice header, and depending on the slice type, the one or more non-adaptive context models are read from the ROM.

14. A device for coding video data, the device comprising:
a plurality of memories configured to store one or more adaptive context models in a read access memory (RAM) and one or more non-adaptive context models in a read only memory (ROM); and
an integrated circuit configured to:
determine information bits associated with a first block of video data;
compare the information bits being equal to or being greater than a threshold value, entropy code the first block of video data-based on one or more adaptive context models that are stored in the RAM, when the one or more adaptive context models are read accessed from the RAM, and storing the entropy coded first block of video data in the RAM;
determine a quantization parameter associated with a second block of video data and a prediction mode for the second block of video data;
perform a comparison between the quantization parameter and a fixed value to switch between a read access of the one or more adaptive context models from the RAM, and a read access of one or more non-adaptive context models from the ROM;
entropy code the first block of video data based on the one or more adaptive context models stored in the RAM, when the one or more adaptive context models are read accessed from the RAM, and store the entropy coded first block of video data in the RAM; and
entropy code the second block of video data based on the one or more non-adaptive context models stored in the ROM, when the one or more non-adaptive context models are read accessed from the ROM.

15. The device of claim 14, wherein the integrated circuit is configured to entropy code the first block of video data using context-based arithmetic coding with the one or more adaptive context models stored in the RAM, and wherein the integrated circuit is configured to entropy code the second block of video data using context-based arithmetic coding with the one or more non-adaptive context models stored in the ROM.

16. The device of claim 14, wherein the first block of video data and the second block of video data are in the same picture or slice.

17. The device of claim 14, wherein the first block of video data and the second block of video data are in different pictures or slices.

18. The device of claim 14, wherein the entropy code the first block of video data is based on the one or more adaptive context models, the integrated circuit is configured to:
adapt the one or more context models is based on at least one of previous input bins or adapt previous output bins to generate the one or more adapted context models stored in the RAM; and
context-based arithmetic code the first block of video data with the one or more adapted context models read from the RAM.

19. The device of claim 14, wherein to entropy code the second block of video data based on the one or more non-adaptive context models in the ROM, the integrated circuit is configured to context-based arithmetic code the second block of video data with the one or more non-adaptive context models read from the ROM.

20. The device of claim 14, wherein to entropy code the second block of video data based on the one or more non-adaptive context models stored in the ROM, the integrated circuit is configured to:
select a location to read access from the ROM based on the quantization parameter before the read access of the one or more non-adaptive context models stored in the ROM from the selected location; and
context-based binary code the second video data with the one or more non-adaptive context models read from the ROM.

21. The device of claim 14, wherein to entropy code the first block of video data, the integrated circuit is configured to determine that a number of times that context-based arithmetic coding with the one or more adaptive context models stored in the RAM is used is greater than or equal to the threshold value; and
wherein to entropy code the second block of video data, the integrated circuit is configured to code the second block of video data based on the one or more non-adaptive context models stored in the ROM is based on the determination that the number of times that context-based arithmetic coding with the one or more adaptive context models stored in the RAM is used is greater than or equal to the threshold value.

22. The device of claim 14, wherein the integrated circuit is configured to:
determine whether to entropy code the first block of video data based on the adaptive context models stored in the RAM based on one or more of:
one or more contexts of the first block of video data;
frequency of use of the one or more adaptive context models stored in the RAM of the first block of video data;

stability of the one or more adaptive context models stored in the RAM used to entropy code the first video data; and comparison of the one or more adaptive contexts in the RAM to the threshold value.

23. The device of claim 14, wherein to entropy code the first block of video data, the integrated circuit is configured to decode the first block of video data based on the one or more adaptive context models stored in the RAM, and wherein to entropy code the second block of video data, the integrated circuit is configured to decode the second block of video data based on the one or more non-adaptive context models stored in the ROM.

24. The device of claim 14, wherein to entropy code the first block of video data, the integrated circuit is configured to encode the first block of video data based on the one or more adaptive context models stored in the RAM, and wherein to entropy code the second block of video data, the integrated circuit is configured to encode the second block of video data based on the one or more non-adaptive context models stored in the ROM.

25. The device of claim 14, further comprising receiving in a slide header a quantization parameter (QP) and a per slice type.

26. The device of claim 25, wherein the QP is based on a slice type of I, P or B, included in a slice header, and depending on the slice type, the one or more non-adaptive context models are read from the ROM.

27. The device of claim 14 further comprising a QP range value based on the quantization parameter, wherein the QP range value is divided into two or more intervals, and based on the two or more intervals, the one or more non-adaptive context models are read from two or more ROMs.

28. The device of claim 27, wherein the QP range value is incudes the value of 64.

29. A non-transitory computer-readable storage medium storing instructions thereon that when executed cause one or more processors to:

determine information bits associated with a first block of video data;

compare the information bits being equal to or being greater than a threshold value, entropy code the first block of video data-based on one or more adaptive context models that are stored in the RAM, when the one or more adaptive context models are read accessed from the RAM, and storing the entropy coded first block of video data in the RAM;

determine a quantization parameter associated with a second block of video data and a prediction mode for the second block of video data;

perform a comparison between the quantization parameter and a fixed value to switch between a read access of the one or more adaptive context models from the RAM, and a read access of one or more non-adaptive context models from the ROM;

entropy code the second block of video data based on the one or more non-adaptive context models stored in the ROM, when the one or more non-adaptive context models are read accessed from the ROM.

* * * * *